(12) United States Patent
Fisher et al.

(10) Patent No.: US 8,395,590 B2
(45) Date of Patent: Mar. 12, 2013

(54) INTEGRATED CONTACT SWITCH AND TOUCH SENSOR ELEMENTS

(75) Inventors: Joseph Fisher, San Jose, CA (US);
Erturk Kocalar, Sunnyvale, CA (US);
Lakshman Rathnam, Mountain View, CA (US)

(73) Assignee: Apple Inc., Cupertino, CA (US)

( * ) Notice: Subject to any disclaimer, the term of this patent is extended or adjusted under 35 U.S.C. 154(b) by 954 days.

(21) Appl. No.: 12/475,925

(22) Filed: Jun. 1, 2009

(65) Prior Publication Data
US 2010/0149127 A1    Jun. 17, 2010

Related U.S. Application Data

(60) Provisional application No. 61/138,524, filed on Dec. 17, 2008, provisional application No. 61/165,188, filed on Mar. 31, 2009.

(51) Int. Cl.
*G09G 5/00* (2006.01)
(52) U.S. Cl. .......................................... 345/173; 345/174
(58) Field of Classification Search .................. 345/156, 345/168, 169, 173, 174; 178/18.01, 18.03, 178/18.06
See application file for complete search history.

(56) References Cited

U.S. PATENT DOCUMENTS

| | | | |
|---|---|---|---|
| 1,061,578 A | 5/1913 | Wischhusen et al. | |
| 2,063,276 A | 12/1936 | Thomas | |
| 2,798,907 A | 7/1957 | Schneider | |
| 2,903,229 A | 9/1959 | Landge | |
| 2,945,111 A | 7/1960 | McCormick | |
| 3,005,055 A | 10/1961 | Mattke | |
| 3,965,399 A | 6/1976 | Walker et al. | |
| 3,996,441 A | 12/1976 | Ohashi | |
| 4,029,915 A | 6/1977 | Ojima | |
| 4,103,252 A | 7/1978 | Bobick | |
| 4,110,749 A | 8/1978 | Janko et al. | |
| 4,115,670 A | 9/1978 | Chandler | |
| 4,121,204 A | 10/1978 | Welch et al. | |
| 4,129,747 A | 12/1978 | Pepper | |
| 4,158,216 A | 6/1979 | Bigelow | |
| 4,242,676 A | 12/1980 | Piguet et al. | |
| 4,246,452 A | 1/1981 | Chandler | |

(Continued)

FOREIGN PATENT DOCUMENTS

| | | |
|---|---|---|
| CN | 1139235 | 1/1997 |
| CN | 1455615 | 11/2003 |

(Continued)

OTHER PUBLICATIONS

Ng et al., U.S. Office Action mailed Dec. 9, 2010, directed to U.S. Appl. No. 11/394,493; 13 pages.

(Continued)

*Primary Examiner* — Regina Liang
(74) *Attorney, Agent, or Firm* — Morrison & Foerster LLP

(57) ABSTRACT

An input device providing integrated contact switch and touch sensor elements is disclosed. A contact switch and touch sensor can be integrated so that they share a common sensor line, achieving space, cost and manufacturing savings over input devices that utilize distinct sensor lines for each of its sensor elements. By configuring a contact switch and touch sensor to share a common sensor line, a controller can use a single pin to scan both the contact switch and touch sensor elements, rather than using distinct pins to scan distinct sensor lines associated with each sensor element. By using fewer pins to scan the same number of sensor elements, a smaller controller can be used which can reduce the size and cost of the input device, and increase manufacturing throughput time associated with the input device.

18 Claims, 20 Drawing Sheets

U.S. PATENT DOCUMENTS

| | | | |
|---|---|---|---|
| 4,264,903 A | 4/1981 | Bigelow | |
| 4,266,144 A | 5/1981 | Bristol | |
| 4,293,734 A | 10/1981 | Pepper, Jr. | |
| D264,969 S | 6/1982 | McGoutry | |
| 4,338,502 A | 7/1982 | Hashimoto et al. | |
| 4,380,007 A | 4/1983 | Steinegger | |
| 4,380,040 A | 4/1983 | Posset | |
| 4,394,649 A | 7/1983 | Suchoff et al. | |
| 4,475,008 A | 10/1984 | Doi et al. | |
| 4,570,149 A | 2/1986 | Thornburg et al. | |
| 4,583,161 A | 4/1986 | Gunderson et al. | |
| 4,587,378 A | 5/1986 | Moore | |
| 4,604,786 A | 8/1986 | Howie, Jr. | |
| 4,613,736 A | 9/1986 | Shichijo et al. | |
| 4,644,100 A | 2/1987 | Brenner et al. | |
| 4,719,524 A | 1/1988 | Morishima et al. | |
| 4,734,034 A | 3/1988 | Maness et al. | |
| 4,736,191 A | 4/1988 | Matzke et al. | |
| 4,739,191 A | 4/1988 | Puar | |
| 4,739,299 A | 4/1988 | Eventoff et al. | |
| 4,752,655 A | 6/1988 | Tajiri et al. | |
| 4,755,765 A | 7/1988 | Ferland | |
| 4,764,717 A | 8/1988 | Tucker et al. | |
| 4,771,139 A | 9/1988 | DeSmet | |
| 4,798,919 A | 1/1989 | Miessler et al. | |
| 4,810,992 A | 3/1989 | Eventoff | |
| 4,822,957 A | 4/1989 | Talmage, Jr. et al. | |
| 4,831,359 A | 5/1989 | Newell | |
| 4,849,852 A | 7/1989 | Mullins | |
| 4,856,993 A | 8/1989 | Maness et al. | |
| 4,860,768 A | 8/1989 | Hon et al. | |
| 4,866,602 A | 9/1989 | Hall | |
| 4,876,524 A | 10/1989 | Jenkins | |
| 4,897,511 A | 1/1990 | Itaya et al. | |
| 4,914,624 A | 4/1990 | Dunthorn | |
| 4,917,516 A | 4/1990 | Retter | |
| 4,943,889 A | 7/1990 | Ohmatoi | |
| 4,951,036 A | 8/1990 | Grueter et al. | |
| 4,954,823 A | 9/1990 | Binstead | |
| 4,976,435 A | 12/1990 | Shatford et al. | |
| 4,990,900 A | 2/1991 | Kikuchi | |
| 5,008,497 A | 4/1991 | Asher | |
| 5,036,321 A | 7/1991 | Leach et al. | |
| 5,053,757 A | 10/1991 | Meadows | |
| 5,086,870 A | 2/1992 | Bolduc | |
| 5,125,077 A | 6/1992 | Hall | |
| 5,159,159 A | 10/1992 | Asher | |
| 5,179,648 A | 1/1993 | Hauck | |
| 5,186,646 A | 2/1993 | Pederson | |
| 5,192,082 A | 3/1993 | Inoue et al. | |
| 5,193,669 A | 3/1993 | Demeo et al. | |
| 5,231,326 A | 7/1993 | Echols | |
| 5,237,311 A | 8/1993 | Mailey et al. | |
| 5,278,362 A | 1/1994 | Ohashi | |
| 5,305,017 A | 4/1994 | Gerpheide | |
| 5,313,027 A | 5/1994 | Inoue et al. | |
| D349,280 S | 8/1994 | Kaneko | |
| 5,339,213 A | 8/1994 | O'Callaghan | |
| 5,367,199 A | 11/1994 | Lefkowitz et al. | |
| 5,374,787 A | 12/1994 | Miller et al. | |
| 5,379,057 A | 1/1995 | Clough et al. | |
| 5,404,152 A | 4/1995 | Nagai | |
| 5,408,621 A | 4/1995 | Ben-Arie | |
| 5,414,445 A | 5/1995 | Kaneko et al. | |
| 5,416,498 A | 5/1995 | Grant | |
| 5,424,756 A | 6/1995 | Ho et al. | |
| 5,432,531 A | 7/1995 | Calder et al. | |
| 5,438,331 A | 8/1995 | Gilligan et al. | |
| D362,431 S | 9/1995 | Kaneko et al. | |
| 5,450,075 A | 9/1995 | Waddington | |
| 5,453,761 A | 9/1995 | Tanaka | |
| 5,473,343 A | 12/1995 | Kimmich et al. | |
| 5,473,344 A | 12/1995 | Bacon et al. | |
| 5,479,192 A | 12/1995 | Carroll, Jr. et al. | |
| 5,494,157 A | 2/1996 | Golenz et al. | |
| 5,495,566 A | 2/1996 | Kwatinetz | |
| 5,508,703 A | 4/1996 | Okamura et al. | |
| 5,508,717 A | 4/1996 | Miller | |
| 5,543,588 A | 8/1996 | Bisset et al. |
| 5,543,591 A | 8/1996 | Gillespie et al. |
| 5,555,004 A | 9/1996 | Ono et al. |
| 5,559,301 A | 9/1996 | Bryan, Jr. et al. |
| 5,559,943 A | 9/1996 | Cyr et al. |
| 5,561,445 A | 10/1996 | Miwa et al. |
| 5,564,112 A | 10/1996 | Hayes et al. |
| 5,565,887 A | 10/1996 | McCambridge et al. |
| 5,578,817 A | 11/1996 | Bidiville et al. |
| 5,581,670 A | 12/1996 | Bier et al. |
| 5,585,823 A | 12/1996 | Duchon et al. |
| 5,589,856 A | 12/1996 | Stein et al. |
| 5,589,893 A | 12/1996 | Gaughan et al. |
| 5,596,347 A | 1/1997 | Robertson et al. |
| 5,596,697 A | 1/1997 | Foster et al. |
| 5,598,183 A | 1/1997 | Robertson et al. |
| 5,611,040 A | 3/1997 | Brewer et al. |
| 5,611,060 A | 3/1997 | Belfiore et al. |
| 5,613,137 A | 3/1997 | Bertram et al. |
| 5,617,114 A | 4/1997 | Bier et al. |
| 5,627,531 A | 5/1997 | Posso et al. |
| 5,632,679 A | 5/1997 | Tremmel |
| 5,640,258 A | 6/1997 | Kurashima et al. |
| 5,648,642 A | 7/1997 | Miller et al. |
| D382,550 S | 8/1997 | Kaneko et al. |
| 5,657,012 A | 8/1997 | Tait |
| 5,661,632 A | 8/1997 | Register |
| D385,542 S | 10/1997 | Kaneko et al. |
| 5,675,362 A | 10/1997 | Clough et al. |
| 5,689,285 A | 11/1997 | Asher |
| 5,721,849 A | 2/1998 | Amro |
| 5,726,687 A | 3/1998 | Belfiore et al. |
| 5,729,219 A | 3/1998 | Armstrong et al. |
| 5,730,165 A | 3/1998 | Philipp |
| 5,748,185 A | 5/1998 | Stephan et al. |
| 5,751,274 A | 5/1998 | Davis |
| 5,754,890 A | 5/1998 | Holmdahl et al. |
| 5,764,066 A | 6/1998 | Novak et al. |
| 5,777,605 A | 7/1998 | Yoshinobu et al. |
| 5,786,818 A | 7/1998 | Brewer et al. |
| 5,790,769 A | 8/1998 | Buxton et al. |
| 5,798,752 A | 8/1998 | Buxton et al. |
| 5,805,144 A | 9/1998 | Scholder et al. |
| 5,808,602 A | 9/1998 | Sellers |
| 5,812,239 A | 9/1998 | Eger |
| 5,812,498 A | 9/1998 | Terés |
| 5,815,141 A | 9/1998 | Phares |
| 5,825,351 A | 10/1998 | Tam |
| 5,825,352 A | 10/1998 | Bisset et al. |
| 5,825,353 A | 10/1998 | Will |
| 5,828,364 A | 10/1998 | Siddiqui |
| 5,838,304 A | 11/1998 | Hall |
| 5,841,078 A | 11/1998 | Miller et al. |
| 5,841,423 A | 11/1998 | Carroll, Jr. et al. |
| D402,281 S | 12/1998 | Ledbetter et al. |
| 5,850,213 A | 12/1998 | Imai et al. |
| 5,856,645 A | 1/1999 | Norton |
| 5,856,822 A | 1/1999 | Du et al. |
| 5,859,629 A | 1/1999 | Tognazzini |
| 5,861,875 A | 1/1999 | Gerpheide |
| 5,869,791 A | 2/1999 | Young |
| 5,875,311 A | 2/1999 | Bertram et al. |
| 5,883,619 A | 3/1999 | Ho et al. |
| 5,889,236 A | 3/1999 | Gillespie et al. |
| 5,889,511 A | 3/1999 | Ong et al. |
| 5,894,117 A | 4/1999 | Kamishima |
| 5,903,229 A | 5/1999 | Kishi |
| 5,907,152 A | 5/1999 | Dandiliker et al. |
| 5,907,318 A | 5/1999 | Medina |
| 5,909,211 A | 6/1999 | Combs et al. |
| 5,910,802 A | 6/1999 | Shields et al. |
| 5,914,706 A | 6/1999 | Kono |
| 5,923,388 A | 7/1999 | Kurashima et al. |
| D412,940 S | 8/1999 | Kato et al. |
| 5,933,102 A | 8/1999 | Miller et al. |
| 5,933,141 A | 8/1999 | Smith |
| 5,936,619 A | 8/1999 | Nagasaki et al. |
| 5,943,044 A | 8/1999 | Martinelli et al. |
| 5,953,000 A | 9/1999 | Weirich |

| | | | | | | |
|---|---|---|---|---|---|---|
| 5,956,019 | A | 9/1999 | Bang et al. | 6,492,979 B1 | 12/2002 | Kent et al. |
| 5,959,610 | A | 9/1999 | Silfvast | 6,496,181 B1 | 12/2002 | Bomer et al. |
| 5,959,611 | A | 9/1999 | Smailagic et al. | 6,497,412 B1 | 12/2002 | Bramm |
| 5,964,661 | A | 10/1999 | Dodge | D468,365 S | 1/2003 | Bransky et al. |
| 5,973,668 | A | 10/1999 | Watanabe | D469,109 S | 1/2003 | Andre et al. |
| 6,000,000 | A | 12/1999 | Hawkins et al. | D472,245 S | 3/2003 | Andre et al. |
| 6,002,093 | A | 12/1999 | Hrehor et al. | 6,546,231 B1 | 4/2003 | Someya et al. |
| 6,002,389 | A | 12/1999 | Kasser et al. | 6,563,487 B2 | 5/2003 | Martin et al. |
| 6,005,299 | A | 12/1999 | Hengst | 6,587,091 B2 | 7/2003 | Serpa |
| 6,025,832 | A | 2/2000 | Sudo et al. | 6,606,244 B1 | 8/2003 | Liu et al. |
| 6,031,518 | A | 2/2000 | Adams et al. | 6,618,909 B1 | 9/2003 | Yang |
| 6,034,672 | A | 3/2000 | Gaultier et al. | 6,636,197 B1 | 10/2003 | Goldenberg et al. |
| 6,057,829 | A | 5/2000 | Silfvast | 6,639,584 B1 | 10/2003 | Li |
| 6,075,533 | A | 6/2000 | Chang | 6,640,250 B1 | 10/2003 | Chang et al. |
| 6,084,574 | A | 7/2000 | Bidiville | 6,650,975 B2 | 11/2003 | Ruffner |
| D430,169 | S | 8/2000 | Scibora | D483,809 S | 12/2003 | Lim |
| 6,097,372 | A | 8/2000 | Suzuki | 6,658,773 B2 | 12/2003 | Rohne et al. |
| 6,104,790 | A | 8/2000 | Narayanaswami | 6,664,951 B1 | 12/2003 | Fujii et al. |
| 6,122,526 | A | 9/2000 | Parulski et al. | 6,677,927 B1 | 1/2004 | Bruck et al. |
| 6,124,587 | A | 9/2000 | Bidiville et al. | 6,678,891 B1 | 1/2004 | Wilcox et al. |
| 6,128,006 | A | 10/2000 | Rosenberg et al. | 6,686,904 B1 | 2/2004 | Sherman et al. |
| 6,131,048 | A | 10/2000 | Sudo et al. | 6,686,906 B2 | 2/2004 | Salminen et al. |
| 6,141,068 | A | 10/2000 | Iijima | 6,703,550 B2 | 3/2004 | Chu |
| 6,147,856 | A | 11/2000 | Karidis | 6,724,817 B1 | 4/2004 | Simpson et al. |
| 6,163,312 | A | 12/2000 | Furuya | 6,727,889 B2 | 4/2004 | Shaw |
| 6,166,721 | A | 12/2000 | Kuroiwa et al. | D489,731 S | 5/2004 | Huang |
| 6,179,496 | B1 | 1/2001 | Chou | 6,738,045 B2 | 5/2004 | Hinckley et al. |
| 6,181,322 | B1 | 1/2001 | Nanavati | 6,750,803 B2 | 6/2004 | Yates et al. |
| D437,860 | S | 2/2001 | Suzuki et al. | 6,781,576 B2 | 8/2004 | Tamura |
| 6,188,391 | B1 | 2/2001 | Seely et al. | 6,784,384 B2 | 8/2004 | Park et al. |
| 6,188,393 | B1 | 2/2001 | Shu | 6,788,288 B2 | 9/2004 | Ano |
| 6,191,774 | B1 | 2/2001 | Schena et al. | 6,791,533 B2 | 9/2004 | Su |
| 6,198,054 | B1 | 3/2001 | Janniere | 6,795,057 B2 | 9/2004 | Gordon |
| 6,198,473 | B1 | 3/2001 | Armstrong | D497,618 S | 10/2004 | Andre et al. |
| 6,211,861 | B1 | 4/2001 | Rosenberg et al. | 6,810,271 B1 | 10/2004 | Wood et al. |
| 6,219,038 | B1 | 4/2001 | Cho | 6,822,640 B2 | 11/2004 | Derocher |
| 6,222,528 | B1 | 4/2001 | Gerpheide et al. | 6,834,975 B2 | 12/2004 | Chu-Chia et al. |
| D442,592 | S | 5/2001 | Ledbetter et al. | 6,844,872 B1 | 1/2005 | Farag et al. |
| 6,225,976 | B1 | 5/2001 | Yates et al. | 6,855,899 B2 | 2/2005 | Sotome |
| 6,225,980 | B1 | 5/2001 | Weiss et al. | 6,865,718 B2 | 3/2005 | Levi Montalcini |
| 6,226,534 | B1 | 5/2001 | Aizawa | 6,886,842 B2 | 5/2005 | Vey et al. |
| 6,227,966 | B1 | 5/2001 | Yokoi | 6,894,916 B2 | 5/2005 | Reohr et al. |
| D443,616 | S | 6/2001 | Fisher et al. | D506,476 S | 6/2005 | Andre et al. |
| 6,243,078 | B1 | 6/2001 | Rosenberg | 6,922,189 B2 | 7/2005 | Fujiyoshi |
| 6,243,080 | B1 | 6/2001 | Molne | 6,930,494 B2 | 8/2005 | Tesdahl et al. |
| 6,243,646 | B1 | 6/2001 | Ozaki et al. | 6,958,614 B2 | 10/2005 | Morimoto |
| 6,248,017 | B1 | 6/2001 | Roach | 6,977,808 B2 | 12/2005 | Lam et al. |
| 6,254,477 | B1 | 7/2001 | Sasaki et al. | 6,978,127 B1 | 12/2005 | Bulthuis et al. |
| 6,256,011 | B1 | 7/2001 | Culver | 6,985,137 B2 | 1/2006 | Kaikuranta |
| 6,259,491 | B1 | 7/2001 | Ekedahl et al. | 7,006,077 B1 | 2/2006 | Uusimäki |
| 6,262,717 | B1 | 7/2001 | Donohue et al. | 7,019,225 B2 | 3/2006 | Matsumoto et al. |
| 6,262,785 | B1 | 7/2001 | Kim | 7,046,230 B2 | 5/2006 | Zadesky et al. |
| 6,266,050 | B1 | 7/2001 | Oh et al. | 7,050,292 B2 | 5/2006 | Shimura et al. |
| 6,285,211 | B1 | 9/2001 | Sample et al. | 7,069,044 B2 | 6/2006 | Okada et al. |
| D448,810 | S | 10/2001 | Goto | 7,078,633 B2 | 7/2006 | Ihalainen |
| 6,297,795 | B1 | 10/2001 | Kato et al. | 7,084,856 B2 | 8/2006 | Huppi |
| 6,297,811 | B1 | 10/2001 | Kent et al. | 7,113,196 B2 | 9/2006 | Kerr |
| 6,300,946 | B1 | 10/2001 | Lincke et al. | 7,117,136 B1 | 10/2006 | Rosedale |
| 6,307,539 | B2 | 10/2001 | Suzuki | 7,119,792 B1 | 10/2006 | Andre et al. |
| D450,713 | S | 11/2001 | Masamitsu et al. | 7,215,319 B2 | 5/2007 | Kamijo et al. |
| 6,314,483 | B1 | 11/2001 | Goto et al. | 7,233,318 B1 | 6/2007 | Farag et al. |
| 6,321,441 | B1 | 11/2001 | Davidson et al. | 7,236,154 B1 | 6/2007 | Kerr et al. |
| 6,323,845 | B1 | 11/2001 | Robbins | 7,236,159 B1 | 6/2007 | Siversson |
| D452,250 | S | 12/2001 | Chan | 7,253,643 B1 | 8/2007 | Seguine |
| 6,340,800 | B1 | 1/2002 | Zhai et al. | 7,279,647 B2 | 10/2007 | Philipp |
| D454,568 | S | 3/2002 | Andre et al. | 7,288,732 B2 | 10/2007 | Hashida |
| 6,357,887 | B1 | 3/2002 | Novak | 7,297,883 B2 | 11/2007 | Rochon et al. |
| D455,793 | S | 4/2002 | Lin | 7,310,089 B2 | 12/2007 | Baker et al. |
| 6,373,265 | B1 | 4/2002 | Morimoto et al. | 7,312,785 B2 | 12/2007 | Tsuk et al. |
| 6,373,470 | B1 | 4/2002 | Andre et al. | 7,321,103 B2 | 1/2008 | Nakanishi et al. |
| 6,377,530 | B1 | 4/2002 | Burrows | 7,333,092 B2 | 2/2008 | Zadesky et al. |
| 6,396,523 | B1 | 5/2002 | Segal et al. | 7,348,898 B2 | 3/2008 | Ono |
| 6,424,338 | B1 | 7/2002 | Anderson | 7,382,139 B2 | 6/2008 | Mackey |
| 6,429,846 | B2 | 8/2002 | Rosenberg et al. | 7,394,038 B2 | 7/2008 | Chang |
| 6,429,852 | B1 | 8/2002 | Adams et al. | 7,395,081 B2 | 7/2008 | Bonnelykke Kristensen et al. |
| 6,452,514 | B1 | 9/2002 | Philipp | 7,397,467 B2 | 7/2008 | Park et al. |
| 6,465,271 | B1 | 10/2002 | Ko et al. | 7,439,963 B2 | 10/2008 | Geaghan et al. |
| 6,473,069 | B1 | 10/2002 | Gerphelde | 7,466,307 B2 | 12/2008 | Trent et al. |
| 6,492,602 | B2 | 12/2002 | Asai et al. | 7,479,949 B2 | 1/2009 | Jobs et al. |

| | | | | | | |
|---|---|---|---|---|---|---|
| 7,486,323 B2 | 2/2009 | Lee et al. | | 2005/0083299 A1 | 4/2005 | Nagasaka |
| 7,502,016 B2 | 3/2009 | Trent, Jr. et al. | | 2005/0083307 A1 | 4/2005 | Aufderheide |
| 7,503,193 B2 | 3/2009 | Schoene et al. | | 2005/0090288 A1 | 4/2005 | Stohr et al. |
| 7,593,782 B2 | 9/2009 | Jobs et al. | | 2005/0104867 A1 | 5/2005 | Westerman et al. |
| 7,645,955 B2 | 1/2010 | Huang et al. | | 2005/0110768 A1 | 5/2005 | Marriott et al. |
| 7,671,837 B2 | 3/2010 | Forsblad et al. | | 2005/0129199 A1 | 6/2005 | Abe |
| 7,708,051 B2 | 5/2010 | Katsumi et al. | | 2005/0139460 A1 | 6/2005 | Hosaka |
| 7,772,507 B2 | 8/2010 | Orr et al. | | 2005/0140657 A1 | 6/2005 | Park et al. |
| 2001/0011991 A1 | 8/2001 | Wang et al. | | 2005/0143124 A1 | 6/2005 | Kennedy et al. |
| 2001/0011993 A1 | 8/2001 | Saarinen | | 2005/0156881 A1 | 7/2005 | Trent et al. |
| 2001/0033270 A1 | 10/2001 | Osawa et al. | | 2005/0162402 A1 | 7/2005 | Watanachote |
| 2001/0043545 A1 | 11/2001 | Aratani | | 2005/0204309 A1 | 9/2005 | Szeto |
| 2001/0050673 A1 | 12/2001 | Davenport | | 2005/0237308 A1 | 10/2005 | Autio et al. |
| 2001/0051046 A1 | 12/2001 | Watanabe et al. | | 2006/0026521 A1 | 2/2006 | Hotelling et al. |
| 2002/0000978 A1 | 1/2002 | Gerpheide | | 2006/0032680 A1 | 2/2006 | Elias et al. |
| 2002/0011993 A1 | 1/2002 | Lui et al. | | 2006/0038791 A1 | 2/2006 | Mackey |
| 2002/0027547 A1 | 3/2002 | Kamijo | | 2006/0095848 A1 | 5/2006 | Naik |
| 2002/0030665 A1 | 3/2002 | Ano | | 2006/0097991 A1 | 5/2006 | Hotelling et al. |
| 2002/0033848 A1 | 3/2002 | Sciammarella et al. | | 2006/0131156 A1 | 6/2006 | Voelckers |
| 2002/0039493 A1 | 4/2002 | Tanaka | | 2006/0143574 A1 | 6/2006 | Ito et al. |
| 2002/0045960 A1 | 4/2002 | Phillips et al. | | 2006/0174568 A1 | 8/2006 | Kinoshita et al. |
| 2002/0071550 A1 | 6/2002 | Pletikosa | | 2006/0181517 A1 | 8/2006 | Zadesky et al. |
| 2002/0089545 A1 | 7/2002 | Levi Montalcini | | 2006/0197750 A1 | 9/2006 | Kerr et al. |
| 2002/0103796 A1 | 8/2002 | Hartley | | 2006/0232557 A1 | 10/2006 | Fallot-Burghardt |
| 2002/0118131 A1 | 8/2002 | Yates et al. | | 2006/0236262 A1 | 10/2006 | Bathiche et al. |
| 2002/0118169 A1 | 8/2002 | Hinckley et al. | | 2006/0250377 A1 | 11/2006 | Zadesky et al. |
| 2002/0145594 A1 | 10/2002 | Derocher | | 2006/0274042 A1 | 12/2006 | Krah et al. |
| 2002/0154090 A1 | 10/2002 | Lin | | 2006/0274050 A1* | 12/2006 | Lii ................................ 345/173 |
| 2002/0158844 A1 | 10/2002 | McLoone et al. | | 2006/0274905 A1 | 12/2006 | Lindahl et al. |
| 2002/0164156 A1 | 11/2002 | Bilbrey | | 2006/0279896 A1 | 12/2006 | Bruwer |
| 2002/0168947 A1 | 11/2002 | Lemley | | 2006/0284836 A1 | 12/2006 | Philipp |
| 2002/0180701 A1 | 12/2002 | Hayama et al. | | 2007/0013671 A1 | 1/2007 | Zadesky et al. |
| 2002/0196239 A1 | 12/2002 | Lee | | 2007/0018970 A1 | 1/2007 | Tabasso et al. |
| 2003/0002246 A1 | 1/2003 | Kerr | | 2007/0052044 A1 | 3/2007 | Forsblad et al. |
| 2003/0025679 A1 | 2/2003 | Taylor et al. | | 2007/0052691 A1 | 3/2007 | Zadesky et al. |
| 2003/0028346 A1 | 2/2003 | Sinclair et al. | | 2007/0080936 A1 | 4/2007 | Tsuk et al. |
| 2003/0043121 A1 | 3/2003 | Chen | | 2007/0080938 A1 | 4/2007 | Robbin et al. |
| 2003/0043174 A1 | 3/2003 | Hinckley et al. | | 2007/0080952 A1 | 4/2007 | Lynch et al. |
| 2003/0050092 A1 | 3/2003 | Yun | | 2007/0083822 A1 | 4/2007 | Robbin et al. |
| 2003/0076301 A1 | 4/2003 | Tsuk et al. | | 2007/0085841 A1 | 4/2007 | Tsuk et al. |
| 2003/0076303 A1 | 4/2003 | Huppi | | 2007/0097086 A1 | 5/2007 | Battles et al. |
| 2003/0076306 A1 | 4/2003 | Zadesky et al. | | 2007/0120834 A1 | 5/2007 | Boillot |
| 2003/0091377 A1 | 5/2003 | Hsu et al. | | 2007/0126696 A1 | 6/2007 | Boillot |
| 2003/0095095 A1 | 5/2003 | Pihlaja | | 2007/0152975 A1 | 7/2007 | Ogihara |
| 2003/0095096 A1 | 5/2003 | Robbin et al. | | 2007/0152977 A1 | 7/2007 | Ng et al. |
| 2003/0098851 A1 | 5/2003 | Brink | | 2007/0152983 A1 | 7/2007 | McKillop et al. |
| 2003/0103043 A1 | 6/2003 | Mulligan et al. | | 2007/0155434 A1 | 7/2007 | Jobs et al. |
| 2003/0122792 A1 | 7/2003 | Yamamoto et al. | | 2007/0157089 A1 | 7/2007 | Van Os et al. |
| 2003/0135292 A1 | 7/2003 | Husgafvel et al. | | 2007/0242057 A1 | 10/2007 | Zadesky et al. |
| 2003/0142081 A1 | 7/2003 | Iizuka et al. | | 2007/0247421 A1 | 10/2007 | Orsley et al. |
| 2003/0184517 A1 | 10/2003 | Senzui et al. | | 2007/0247443 A1 | 10/2007 | Philipp |
| 2003/0197740 A1 | 10/2003 | Reponen | | 2007/0271516 A1 | 11/2007 | Carmichael |
| 2003/0206202 A1 | 11/2003 | Moriya | | 2007/0273671 A1 | 11/2007 | Zadesky et al. |
| 2003/0210537 A1 | 11/2003 | Engelmann | | 2007/0276525 A1 | 11/2007 | Zadesky et al. |
| 2003/0224831 A1 | 12/2003 | Engstrom et al. | | 2007/0279394 A1 | 12/2007 | Lampell |
| 2004/0027341 A1 | 2/2004 | Derocher | | 2007/0285404 A1 | 12/2007 | Rimon et al. |
| 2004/0074756 A1 | 4/2004 | Kawakami et al. | | 2007/0290990 A1 | 12/2007 | Robbin et al. |
| 2004/0080682 A1 | 4/2004 | Dalton | | 2007/0291016 A1 | 12/2007 | Philipp |
| 2004/0109357 A1 | 6/2004 | Cernea et al. | | 2007/0296709 A1 | 12/2007 | GuangHai |
| 2004/0150619 A1 | 8/2004 | Baudisch et al. | | 2008/0006453 A1 | 1/2008 | Hotelling et al. |
| 2004/0156192 A1 | 8/2004 | Kerr et al. | | 2008/0006454 A1 | 1/2008 | Hotelling |
| 2004/0178997 A1 | 9/2004 | Gillespie et al. | | 2008/0007533 A1 | 1/2008 | Hotelling et al. |
| 2004/0200699 A1 | 10/2004 | Matsumoto et al. | | 2008/0007539 A1 | 1/2008 | Hotelling et al. |
| 2004/0215986 A1 | 10/2004 | Shakkarwar | | 2008/0012837 A1 | 1/2008 | Marriott et al. |
| 2004/0224638 A1 | 11/2004 | Fadell et al. | | 2008/0018615 A1 | 1/2008 | Zadesky et al. |
| 2004/0239622 A1 | 12/2004 | Proctor et al. | | 2008/0018616 A1 | 1/2008 | Lampell et al. |
| 2004/0252109 A1 | 12/2004 | Trent, Jr. et al. | | 2008/0018617 A1 | 1/2008 | Ng et al. |
| 2004/0252867 A1 | 12/2004 | Lan et al. | | 2008/0036473 A1 | 2/2008 | Jansson |
| 2004/0253989 A1 | 12/2004 | Tupler et al. | | 2008/0036734 A1 | 2/2008 | Forsblad et al. |
| 2004/0263388 A1 | 12/2004 | Krumm et al. | | 2008/0060925 A1 | 3/2008 | Weber et al. |
| 2004/0267874 A1 | 12/2004 | Westberg et al. | | 2008/0069412 A1 | 3/2008 | Champagne et al. |
| 2005/0012644 A1 | 1/2005 | Hurst et al. | | 2008/0079699 A1 | 4/2008 | Mackey |
| 2005/0017957 A1 | 1/2005 | Yi | | 2008/0087476 A1 | 4/2008 | Prest |
| 2005/0024341 A1 | 2/2005 | Gillespie et al. | | 2008/0088582 A1 | 4/2008 | Prest |
| 2005/0030048 A1 | 2/2005 | Bolender | | 2008/0088596 A1 | 4/2008 | Prest |
| 2005/0052425 A1 | 3/2005 | Zadesky et al. | | 2008/0088597 A1 | 4/2008 | Prest |
| 2005/0052426 A1 | 3/2005 | Hagermoser et al. | | 2008/0088600 A1 | 4/2008 | Prest |
| 2005/0052429 A1 | 3/2005 | Philipp | | 2008/0094352 A1 | 4/2008 | Tsuk et al. |
| 2005/0068304 A1 | 3/2005 | Lewis et al. | | 2008/0098330 A1 | 4/2008 | Tsuk et al. |

| | | | |
|---|---|---|---|
| 2008/0110739 A1 | 5/2008 | Peng et al. | |
| 2008/0111795 A1 | 5/2008 | Bollinger | |
| 2008/0143681 A1 | 6/2008 | XiaoPing | |
| 2008/0165158 A1 | 7/2008 | Hotelling et al. | |
| 2008/0196945 A1 | 8/2008 | Konstas | |
| 2008/0202824 A1 | 8/2008 | Philipp et al. | |
| 2008/0209442 A1 | 8/2008 | Setlur et al. | |
| 2008/0264767 A1 | 10/2008 | Chen et al. | |
| 2008/0280651 A1 | 11/2008 | Duarte | |
| 2008/0284742 A1 | 11/2008 | Prest | |
| 2008/0293274 A1 | 11/2008 | Milan | |
| 2009/0021267 A1 | 1/2009 | Golovchenko et al. | |
| 2009/0026558 A1 | 1/2009 | Bauer et al. | |
| 2009/0033635 A1 | 2/2009 | Wai | |
| 2009/0036176 A1 | 2/2009 | Ure | |
| 2009/0058687 A1 | 3/2009 | Rothkopf et al. | |
| 2009/0058801 A1 | 3/2009 | Bull | |
| 2009/0058802 A1 | 3/2009 | Orsley | |
| 2009/0073130 A1 | 3/2009 | Weber et al. | |
| 2009/0078551 A1 | 3/2009 | Kang | |
| 2009/0109181 A1 | 4/2009 | Hui et al. | |
| 2009/0141046 A1 | 6/2009 | Rathnam et al. | |
| 2009/0160771 A1 | 6/2009 | Hinckley et al. | |
| 2009/0179854 A1 | 7/2009 | Weber et al. | |
| 2009/0197059 A1 | 8/2009 | Weber et al. | |
| 2009/0229892 A1 | 9/2009 | Fisher et al. | |
| 2009/0273573 A1 | 11/2009 | Hotelling | |
| 2010/0058251 A1 | 3/2010 | Rottler et al. | |
| 2010/0060568 A1 | 3/2010 | Fisher et al. | |
| 2010/0073319 A1 | 3/2010 | Lyon et al. | |
| 2010/0289759 A1 | 11/2010 | Fisher et al. | |
| 2010/0313409 A1 | 12/2010 | Weber et al. | |
| 2011/0005845 A1 | 1/2011 | Hotelling et al. | |

FOREIGN PATENT DOCUMENTS

| | | |
|---|---|---|
| CN | 1499356 | 5/2004 |
| CN | 1659506 | 8/2005 |
| DE | 3615742 | 11/1987 |
| DE | 19722636 | 12/1998 |
| DE | 10022537 | 11/2000 |
| DE | 20019074 U1 | 2/2001 |
| DE | 10 2004 043 663 | 4/2006 |
| EP | 0178157 | 4/1986 |
| EP | 0419145 A1 | 3/1991 |
| EP | 0 498 540 | 8/1992 |
| EP | 0 521 683 | 1/1993 |
| EP | 0 674 288 | 9/1995 |
| EP | 0 731 407 | 9/1996 |
| EP | 0 551 778 B1 | 1/1997 |
| EP | 0 880 091 A2 | 11/1998 |
| EP | 1 026 713 | 8/2000 |
| EP | 1 081 922 A2 | 3/2001 |
| EP | 1 098 241 A2 | 5/2001 |
| EP | 1 133 057 | 9/2001 |
| EP | 1 162 826 A2 | 12/2001 |
| EP | 1 168 396 | 1/2002 |
| EP | 1 205 836 A2 | 5/2002 |
| EP | 1 244 053 | 9/2002 |
| EP | 1 251 455 A2 | 10/2002 |
| EP | 1263193 | 12/2002 |
| EP | 1347481 | 9/2003 |
| EP | 1376326 | 1/2004 |
| EP | 1 467 392 | 10/2004 |
| EP | 1 482 401 | 12/2004 |
| EP | 1 496 467 | 1/2005 |
| EP | 1 517 228 | 3/2005 |
| EP | 1 542 437 A2 | 6/2005 |
| EP | 1 589 407 | 10/2005 |
| EP | 1 784 058 A2 | 5/2007 |
| EP | 1 841 188 | 10/2007 |
| EP | 1850218 | 10/2007 |
| EP | 1 876 711 | 1/2008 |
| FR | 2 686 440 | 7/1993 |
| GB | 2015167 | 9/1979 |
| GB | 2072389 | 9/1981 |
| GB | 2315186 | 1/1998 |
| GB | 2333215 | 7/1999 |
| GB | 2391060 | 1/2004 |
| GB | 2 402 105 | 12/2004 |
| JP | 57-95722 | 6/1982 |
| JP | 57-97626 | 6/1982 |
| JP | 61-117619 | 6/1986 |
| JP | 61-124009 | 6/1986 |
| JP | 63-20411 | 1/1988 |
| JP | 63-106826 | 5/1988 |
| JP | 63-181022 | 7/1988 |
| JP | 63-298518 | 12/1988 |
| JP | 03-57617 | 6/1991 |
| JP | 3-192418 | 8/1991 |
| JP | 04-32920 | 2/1992 |
| JP | 4-205408 | 7/1992 |
| JP | 5-041135 | 2/1993 |
| JP | 5-080938 | 4/1993 |
| JP | 5-101741 | 4/1993 |
| JP | 5-36623 | 5/1993 |
| JP | 5-189110 | 7/1993 |
| JP | 5-205565 | 8/1993 |
| JP | 5-211021 | 8/1993 |
| JP | 5-217464 | 8/1993 |
| JP | 5-233141 | 9/1993 |
| JP | 5-262276 | 10/1993 |
| JP | 5-265656 | 10/1993 |
| JP | 5-274956 | 10/1993 |
| JP | 5-289811 | 11/1993 |
| JP | 5-298955 | 11/1993 |
| JP | 5-325723 | 12/1993 |
| JP | 6-20570 | 1/1994 |
| JP | 6-084428 | 3/1994 |
| JP | 6-089636 | 3/1994 |
| JP | 6-96639 | 4/1994 |
| JP | 6-111695 | 4/1994 |
| JP | 6-139879 | 5/1994 |
| JP | 6-187078 | 7/1994 |
| JP | 6-208433 | 7/1994 |
| JP | 6-267382 | 9/1994 |
| JP | 6-283993 | 10/1994 |
| JP | 6-333459 | 12/1994 |
| JP | 7-107574 | 4/1995 |
| JP | 8-115158 | 5/1995 |
| JP | 7-41882 | 7/1995 |
| JP | 7-201249 | 8/1995 |
| JP | 7-201256 | 8/1995 |
| JP | 7-253838 | 10/1995 |
| JP | 7-261899 | 10/1995 |
| JP | 7-261922 | 10/1995 |
| JP | 7-296670 | 11/1995 |
| JP | 7-319001 | 12/1995 |
| JP | 8-016292 | 1/1996 |
| JP | 8-203387 | 8/1996 |
| JP | 8-293226 | 11/1996 |
| JP | 8-298045 | 11/1996 |
| JP | 8-299541 | 11/1996 |
| JP | 8-316664 | 11/1996 |
| JP | 9-044289 | 2/1997 |
| JP | 9-069023 | 3/1997 |
| JP | 9-128148 | 5/1997 |
| JP | 9-134248 | 5/1997 |
| JP | 9-218747 | 8/1997 |
| JP | 9-230993 | 9/1997 |
| JP | 9-231858 | 9/1997 |
| JP | 9-233161 | 9/1997 |
| JP | 9-251347 | 9/1997 |
| JP | 9-258895 | 10/1997 |
| JP | 9-288926 | 11/1997 |
| JP | 9-512979 | 12/1997 |
| JP | 10-63467 | 3/1998 |
| JP | 10-74127 | 3/1998 |
| JP | 10-074429 | 3/1998 |
| JP | 10-198507 | 7/1998 |
| JP | 10-227878 | 8/1998 |
| JP | 10-240693 | 9/1998 |
| JP | 10-320322 | 12/1998 |
| JP | 10-326149 | 12/1998 |
| JP | 11-24834 | 1/1999 |
| JP | 11-184607 | 7/1999 |

| | | |
|---|---|---|
| JP | 11-194863 | 7/1999 |
| JP | 11-194872 | 7/1999 |
| JP | 11-194882 | 7/1999 |
| JP | 11-194883 | 7/1999 |
| JP | 11-194891 | 7/1999 |
| JP | 11-195353 | 7/1999 |
| JP | 11-203045 | 7/1999 |
| JP | 11-212725 | 8/1999 |
| JP | 11-272378 | 10/1999 |
| JP | 11-338628 | 12/1999 |
| JP | 2000-200147 | 7/2000 |
| JP | 2000-215549 | 8/2000 |
| JP | 2000-267777 | 9/2000 |
| JP | 2000-267786 | 9/2000 |
| JP | 2000-267797 | 9/2000 |
| JP | 2000-353045 | 12/2000 |
| JP | 2001-11769 | 1/2001 |
| JP | 2001-22508 | 1/2001 |
| JP | 2001-184158 | 7/2001 |
| JP | 3085481 | 2/2002 |
| JP | 2002-215311 | 8/2002 |
| JP | 2003-015796 | 1/2003 |
| JP | 2003-060754 | 2/2003 |
| JP | 2003-099198 | 4/2003 |
| JP | 2003-150303 | 5/2003 |
| JP | 2003-517674 | 5/2003 |
| JP | 2003-280799 | 10/2003 |
| JP | 2003-280807 | 10/2003 |
| JP | 2004-362097 | 12/2004 |
| JP | 2005-251218 | 9/2005 |
| JP | 2005-285140 | 10/2005 |
| JP | 2005-293606 | 10/2005 |
| JP | 2006-004453 | 1/2006 |
| JP | 2006-178962 | 7/2006 |
| JP | 3852854 | 12/2006 |
| JP | 2007-123473 | 5/2007 |
| KR | 1998-71394 | 10/1998 |
| KR | 1999-50198 | 7/1999 |
| KR | 2000-0008579 | 2/2000 |
| KR | 2001-0052016 | 6/2001 |
| KR | 2001-108361 | 12/2001 |
| KR | 2002-65059 | 8/2002 |
| KR | 10-2006-0021678 | 3/2006 |
| TW | 431607 | 4/2001 |
| TW | 00470193 | 12/2001 |
| TW | 547716 | 8/2003 |
| TW | I220491 | 8/2004 |
| WO | WO-94/17494 | 8/1994 |
| WO | WO-95/00897 A1 | 1/1995 |
| WO | WO-96/27968 | 9/1996 |
| WO | WO 98/14863 | 4/1998 |
| WO | WO-99/49443 | 9/1999 |
| WO | WO-00/79772 | 12/2000 |
| WO | WO-01/02949 | 1/2001 |
| WO | WO-01/44912 | 6/2001 |
| WO | WO-02/08881 | 1/2002 |
| WO | WO-03/044645 | 5/2003 |
| WO | WO-03/044956 | 5/2003 |
| WO | WO-03/025960 | 9/2003 |
| WO | WO-03/088176 | 10/2003 |
| WO | WO-03/090008 | 10/2003 |
| WO | WO-2004/001573 | 12/2003 |
| WO | WO-2004/040606 | 5/2004 |
| WO | WO-2004/091956 | 10/2004 |
| WO | WO-2005/055620 | 6/2005 |
| WO | WO-2005/076117 | 8/2005 |
| WO | WO-2005/114369 | 12/2005 |
| WO | WO-2005/124526 | 12/2005 |
| WO | WO-2006/020305 | 2/2006 |
| WO | WO-2006/021211 A2 | 3/2006 |
| WO | WO-2006/037545 | 4/2006 |
| WO | WO 2006/104745 | 10/2006 |
| WO | WO-2006/135127 | 12/2006 |
| WO | WO-2007/025858 | 3/2007 |
| WO | WO-2007/078477 | 7/2007 |
| WO | WO-2007/084467 | 7/2007 |
| WO | WO-2007/089766 | 8/2007 |
| WO | WO-2008/007372 | 1/2008 |
| WO | WO-2008/045414 | 4/2008 |
| WO | WO-2008/045833 | 4/2008 |

OTHER PUBLICATIONS

Zadesky et al., U.S. Office Action mailed Nov. 16, 2010, directed to U.S. Appl. No. 11/477,469; 13 pages.
Lampell, U.S. Office Action mailed Dec. 3, 2010, directed to U.S. Appl. No. 11/530,807; 17 pages.
Lampell et al., U.S. Office Action mailed Dec. 22, 2010, directed to U.S. Appl. No. 11/882,427; 16 pages.
Hotelling, U.S. Office Action mailed Dec. 8, 2010, directed to U.S. Appl. No. 11/482,286; 33 pages.
Elias et al., U.S. Office Action mailed Nov. 22, 2010, directed to U.S. Appl. No. 11/203,692; 6 pages.
IPRP and Written Opinion mailed Dec. 3, 2010, directed to counterpart application No. PCT/US2009/068276; 10 pages.
Zadesky et al, U.S. Office Action mailed Feb. 1, 2011, directed to U.S. Appl. No. 11/882,004; 16 pages.
Bull, U.S. Office Action mailed Feb. 4, 2011, directed to U.S. Appl. No. 11/849,801; 22 pages.
Weber et al, U.S. Office Action mailed Jan. 7, 2011, directed to U.S. Appl. No. 11/856,530; 13 pages.
Weber et al., U.S. Office Action mailed Jan. 7, 2011, directed to U.S. Appl. No. 12/205,795; 21 pages.
Weber et al., U.S. Office Action mailed Feb. 17, 2011, directed to U.S. Appl. No. 12/844,502; 11 pages.
Lynch et al., U.S. Office Action mailed Oct. 5, 2009, directed to U.S. Appl. No. 11/499,360; 7 pages.
Lynch et al., U.S. Office Action mailed Jan. 27, 2010, directed to U.S. Appl. No. 11/499,360; 8 pages.
Ng et al., U.S. Office Action mailed Jan. 14, 2010, directed to U.S. Appl. No. 11/394,493; 20 pages.
Ng et al., U.S. Office Action mailed Jan. 15, 2010, directed to U.S. Appl. No. 11/882,423; 22 pages.
Tsuk et al., U.S. Office Action mailed Dec. 31, 2009, directed to U.S. Appl. No. 11/610,190; 25 pages.
Zadesky et al., U.S. Office Action mailed Feb. 4, 2010, directed to U.S. Appl. No. 11/477,469; 14 pages.
Hotelling, U.S. Office Action mailed Jan. 25, 2010, directed to U.S. Appl. No. 11/482,286; 17 pages.
Interlink Electronics, VersaPad: Integration Guide, © 1998 (VersaPad), pp. 1-35.
Letter re: Bang & Olufsen a/s by David Safran, Nixon Peabody, LLP, May 21, 2004, with BeoCom 6000 Sales Training Brochure, 7 pages.
Kobayashi et al. (1994) "Development of the Touch Switches with the Click Response," Koukuu Denshi Gihou No. 17, pp. 44-48 (published by the Japan Aviation Electronics Industry, Ltd.).
Photographs of Innovation 2000 Best of Show Award Presented at the 2000 Int'l CES Innovations Design & Engineering Showcase, Jan. 6, 2000, 1 page.
SanDisk Sansa Connect User Guide, 2007; 29 pages.
Tsuk et al., U.S. Office Action mailed Apr. 19, 2011, directed to U.S. Appl. No. 11/610,190; 25 pages.
Tsuk et al., U.S. Office Action mailed Mar. 31, 2011, directed to U.S. Appl. No. 11/959,918; 9 pages.
Robbin et al., U.S. Office Action mailed Apr. 26, 2011, directed to U.S. Appl. No. 11/838,845; 9 pages.
Zadesky et al., U.S. Office Action mailed Mar. 31, 2011, directed to U.S. Appl. No. 11/882,005; 7 pages.
Bollinger et al., U.S. Office Action mailed Mar. 21, 2011, directed to U.S. Appl. No. 11/842,724; 22 pages.
McKillop et al., U.S. Office Action mailed Mar. 24, 2011, directed to U.S. Appl. No. 11/591,752; 11 pages.
Zadesky et al., U.S. Office Action mailed Mar. 16, 2011, directed to U.S. Appl. No. 11/882,003; 12 pages.
Rathnam et al., U.S. Office Action mailed Mar. 24, 2011, directed to U.S. Appl. No. 12/205,757; 14 pages.
Tsuk et al., U.S. Office Action mailed Apr. 28, 2010, directed to U.S. Appl. No. 11/610,190; 29 pages.
Zadesky et al., U.S. Office Action mailed Mar. 30, 2010, directed to U.S. Appl. No. 11/592,679; 13 pages.

Hotelling et al., U.S. Office Action mailed Mar. 30, 2010, directed to U.S. Appl. No. 11/483,008; 20 pages.
Elias et al., U.S. Office Action mailed Mar. 30, 2010, directed to U.S. Appl. No. 11/203,692; 15 pages.
Ng et al., U.S. Office Action mailed Jun. 22, 2010, directed to U.S. Appl. No. 11/394,493; 14 pages.
Lampell, U.S. Office Action mailed Jun. 4, 2010, directed to U.S. Appl. No. 11/530,807; 15 pages.
Prest et al., U.S. Office Action mailed Jun. 22, 2010, directed to U.S. Appl. No. 11/878,132; 32 pages.
Prest et al., U.S. Office Action mailed Jun. 22, 2010, directed to U.S. Appl. No. 11/882,882; 32 pages.
Prest et al., U.S. Office Action mailed Jun. 23, 2010, directed to U.S. Appl. No. 11/812,384; 29 pages.
Prest et al., U.S. Office Action mailed Jun. 22, 2010, directed to U.S. Appl. No. 11/882,890; 15 pages.
Prest et al., U.S. Office Action mailed Jun. 22, 2010, directed to U.S. Appl. No. 11/812,383; 21 pages.
Prest et al., U.S. Office Action mailed Jun. 23, 2010, directed to U.S. Appl. No. 11/882,889; 13 pages.
Bollinger et al., U.S. Office Action mailed Jun. 25, 2010, directed to U.S. Appl. No. 11/842,724; 22 pages.
Hotelling, U.S. Office mailed Jun. 9, 2010, directed to U.S. Appl. No. 11/482,286; 21 pages.
Elias et al., U.S. Office Action mailed Jun. 11, 2010, directed to U.S. Appl. No. 11/203,692; 17 pages.
Weber et al., U.S. Office Action mailed Jun. 7, 2010, directed to U.S. Appl. No. 11/856,530; 15 pages.
Ng et al., U.S. Office Action mailed Jul. 8, 2010, directed to U.S. Appl. No. 11/882,423; 19 pages.
"About Quicktip®" www.logicad3d.com/docs/qt.html, downloaded Apr. 8, 2002.
"Alps Electric Ships GlidePoint Keyboard for the Macintosh; Includes a GlidePoint Touchpad, Erase-Eaze Backspace Key and Contoured Wrist Rest," Business Wire (Jul. 1, 1996).
"Alps Electric introduces the GlidePoint Wave Keyboard; combines a gently curved design with Alps' advanced GlidePoint Technology," Business Wire (Oct. 21, 1996).
"Apple Presents iPod: Ultra-Portable MP3 Music Player Puts 1,000 Songs in Your Pocket," retreived from http://www.apple.com/pr/library/2001/oct/23ipod.html on Oct. 23, 2001.
"Apple Unveils Optical Mouse and New Pro Keyboard," Press Release, Jul. 19, 2000.
"APS show guide to exhibitors," Physics Today 49(3) (Mar. 1996).
"Atari VCS/2600 Peripherals," www.classicgaming.com/gamingmuseum/2006p.htmi, downloaded Feb. 28, 2007, pp. 1-15.
"Der Klangmeister," Connect Magazine, Aug. 1998.
"Design News literature plus," Design News 51(24) (Dec. 18, 1995).
"Neuros MP3 Digital Audio Computer," www.neurosaudio.com, downloaded Apr. 9, 2003.
"OEM Touchpad Modules" website www.glidepoint.com/sales/modules.index.shtml, downloaded Feb. 13, 2002.
"Product Overview—ErgoCommander®," www.logicad3d.com/products/ErgoCommander.htm, downloaded Apr. 8, 2002.
"Product Overview—SpaceMouse® Classic," www.logicad3d.com/products/Classic.htm, downloaded Apr. 8, 2002.
"System Service and Troubleshooting Manual," www.dsplib.com/intv/Master, downloaded Dec. 11, 2002.
"Synaptics Tough Pad Interfacing Guide," Second Edition, Mar. 25, 1998, Synaptics, Inc., San Jose, CA, pp. 1-90.
"Triax Custom Controllers due; Video Game Controllers," HFD—The Weekly Home Furnishing Newspaper 67(1) (Jan. 4, 1993).
Ahl, David, "Controller Update," Creative Computing Vo. 9, No. 12, Dec. 1983.
Ahmad, "A Usable Real-Time 3D Hand Tracker," Proceedings of the 28th Asilomar Conference on Signals, Systems and Computers—Part 2 (of 2) vol. 2 (Oct. 1994).
Baig, E.C., "Your PC Just Might Need a Mouse," U.S. News & World Report 108(22) (Jun. 4, 1990).
Bang & Olufsen Telecom a/s, "BeoCom 6000 User Guide 2000."
Bartimo, Jim, "The Portables: Travelling Quickly," Computerworld (Nov. 14, 1983).
BeoCom 6000, Sales Training Brochure, date unknown.

Bray, "Phosphors help switch on xenon," Physics in Action, pp. 1-3, Apr. 1999.
Brink et al., "Pumped-up portables," U.S. News & World Report 116(21) (May 30, 1994).
Brown et al., "Windows on Tablets as a Means of Achieving Virtual Input Devices," Human-Computer Interaction—INTERACT '90 (1990).
Buxton et al., "Issues and Techniques in Touch-Sensitive Tablet Input," Computer Graphics 19(3), Proceedings of SIGGRAPH '85 (1985).
Chapweske, Adam "PS/2 Mouse/Keyboard Protocol," 1999, http://panda.cs.ndsu.nodak.edu~achapwes/PICmicro/PS2/ps2.htm.
Chen et al., "A Study in Interactive 3-D Rotation Using 2-D Control Devices," Computer Graphics 22(4) (Aug. 1988).
Chinese Office Action issue Dec. 29, 2006, directed to CN Application No. 200510103886.3, 25 pages.
De Meyer, Kevin, "Crystal Optical Mouse," Feb. 14, 2002, Heatseekerz, Web Article 19.
Evans et al., "Tablet-based Valuators that Provide One, Two, or Three Degrees of Freedom," Computer Grahics 15(3) (Aug. 1981).
EVB Elektronik "TSOP6238 IR Receiver Modules for Infrared Remote Control Systems" dated Jan. 2004 1 page.
Fiore, "Zen Touchpad," Cornell University, May 2000.
Gadgetboy, "Point and click with the latest mice," CNET Asia Product Review, www.asia.cnet.com/reviews...are/gadgetboy/0,39001770,380235900,00.htm, downloaded Dec. 5, 2001.
Gfroerer, "Photoluminescence in Analysis of Surfaces and Interfaces," Encyclopedia of Analytical Chemistry, pp. 1-23, Copyright John Wiley & Sons Ltd, Chichester, 2000.
Jesitus, John, "Broken promies?", Industry Week/IW 246(20) (Nov. 3, 1997).
Kobayashi (1996) "Design of Dynamic Soundscape: Mapping Time to Space for Audio Browsing with Simultaneous Listening," Thesis submitted to Program, in Media Arts and Sciences at the Massachusetts Institute of Technology, (58 pages).
Kobayashi et al. (1997) "Dynamic Soundscape: Mapping Time to Space for Audio Browsing," Computer Human Interaction: 16 pages.
Kobayashi et al. "Development of the Touch Switches with the Click Response," Koukuu Denshi Gihou No. 17, pp. 44-48 (1994-3) (published by the Japan Aviation Electronics Industry, Ltd.).
Letter re: Bang & Olufsen a/s by David Safran, Nixon Peabody, LLP May 21, 2004.
Luna Technologies International, Inc., LUNA Photoluminescent Safety Products, "Photoluminescence—What is Photoluminescence?" from website at http://www.lunaplast.com/photoluminescence.com on Dec. 27, 2005.
"Manufactures," Laser Focus World, Buyers Guide '96, 31(12) (Dec. 1995).
Mims, Forrest M., III, "A Few Quick Pointers; Mouses, Touch Screens, Touch Pads, Light Pads, and The Like Can Make System Easier to Use," Computers & Electronics (22) (May 1984).
Nass, Richard, "Touchpad input device goes digital to give portable systems a desktop 'mouse-like' feel," Electronic Design 44(18) (Sep. 3, 1996).
"National Design Engineering Show," Design News 52(5) (Mar. 4, 1996).
Perenson, Melissa, "New & Improved: Touchpad Redux," PC Magazine (Sep. 10, 1996).
Petersen, Marty, "Koala Pad Touch Tablet & Micro Illustrator Software," InfoWorld (Oct. 10, 1983).
Petruzzellis, "Force-Sensing Resistors," Electronics Now 64(3) (Mar. 1993).
Photographs of Innovation 2000 Best of Show Award Presented at the 2000 Int'l CES Innovations 2000 Design & Engineering Showcase, 1 page.
"Preview of exhibitor booths at the Philadelphia show," Air Conditioning, Heating & News 200(2) (Jan. 13, 1997).
"Product news," Design News 53(9) (May 5, 1997).
"Product news," Design News 53(11) (Jun. 9, 1997).
Sony presents "Choice Without Compromise" at IBC '97 M2 PRESSWIRE (Jul. 24, 1997).
Spiwak, Marc, "A Great New Wireless Keyboard," Popular Electronics 14(12) (Dec. 1997).

Spiwak, Marc, "A Pair of Unusual Controllers," Popular Electronics 14(4) (Apr. 1997).

Soderholm, Lars G., "Sensing Systems for 'Touch and Feel,'" Design News (May 8, 1989): pp. 72-76.

Sylvania, "Intellvision™ Intelligent Television Master Component Service Manual," pp. 1, 2 and 8, 1979.

Tessler, Franklin, "Point Pad," Macworld 12(10) (Oct. 1995).

Tessler, Franklin, "Touchpads," Macworld 13(2) (Feb. 1996).

Tessler, Franklin, "Smart Input: How to Chose from the New Generation of Innovative Input Devices," Macworld 13(5) (May 1996).

SanDisk Sansa Connect User Guide; 29 pages.

"Touchpad," Notebook PC Manual, ACER Information Co. Ltd., Feb. 16, 2005, pp. 11-12.

Translation of Trekstor's Defense Statement to the District Court Mannheim of May 23, 2008; 37 pages.

"Diamond Multimedia Announces Rio PMP300 Portable MP3 Music Player," located at http://news.harmony-central.com/Newp/1998/Rio-PMP300.html visited on May 5, 2008. (4 pages).

Robbin, U.S. Appl. No. 60/346,237 entitled, "Method and System for List Scrolling," filed Oct. 22, 2001; 12 pages.

Zadesky et al., U.S. Appl. No. 60/359,551 entitled "Touchpad for Handheld Device," filed Feb. 25. 2002; 34 pages.

Grignon et al., U.S. Appl. No. 60/755,656, filed Dec. 30, 2005, entitled "Touch Pad with Feedback"; 109 pages.

Elias et al., U.S. Appl. No. 60/522,107, filed Aug. 16, 2004, entitled, "A Method for Increasing the Spatial Resolution of Touch Sensitive Devices"; 15 pages.

Hotelling, U.S. Appl. No. 60/658,777 titled "Multi-Functional Handheld Device," filed Mar. 4, 2005; 68 pages.

Zadesky et al., U.S. Appl. No. 60/714,609 entitled "Scrolling Input Arrangements Using Capacitive Sensors on a Flexible Membrane," filed Sep. 6, 2005; 17 pages.

Lampell et al., U.S. Appl. No. 60/810,423, filed Jun. 2, 2006, entitled "Techniques for Interactive Input to Portable Electronic Devices"; 53 pages.

Prest et al., U.S. Appl. No. 60/850,662, filed Oct. 11, 2006, entitled, "Capacitive Scroll Wheel"; 21 pages.

Bollinger, U.S. Appl. No. 60/858,404, filed Nov. 13, 2006, entitled "Method of Capacitively Sensing Finger Position"; 13 pages.

Rothkopf, U.S. Appl. No. 60/935,854 titled "Compact Media Players," filed Sep. 4, 2007; 36 pages.

Rathnam et al., U.S. Appl. No. 60/992,056, filed Dec. 3, 2007, entitled, "Scroll Wheel Circuit Arrangements and Methods of Use Thereof"; 42 pages.

Rathnam et al., U.S. Appl. No. 61/017,436, filed Dec. 28, 2007, entitled, "Multi-Touch Scroll Wheel Circuit Arrangements and Processing Methods"; 58 pages.

Weber et al., U.S. Appl. No. 61/020,531, filed Jan. 11, 2008 entitled "Modifiable Clickwheel Text"; 11 pages.

Weber et al., U.S. Appl. No. 61/025,531, filed Feb. 1, 2008 entitled "Co-Extruded Materials and Methods"; 11 pages.

Fisher et al., U.S. Appl. No. 61/036,804, filed Mar. 14, 2008 entitled "Switchable Sensor Configurations"; 46 pages.

Robbin et al., U.S. Appl. No. 60/387,692 entitled "Method and Apparatus for Use of Rotational User Inputs," filed Jun. 10, 2002.

Robbin et al., U.S. Appl. No. 60/399,806 entitled "Graphical User Interface and Methods of Use Thereof in a Multimedia Player," filed Jul. 30, 2002.

Tsuk et al., U.S. Office Action mailed Oct. 13, 2006, directed to U.S. Appl. No. 10/256,716; 16 pages.

Tsuk et al., U.S. Office Action mailed Aug. 3, 2006, directed to U.S. Appl. No. 10/256,716; 15 pages.

Tsuk et al., U.S. Office Action mailed Jan. 10, 2006, directed to U.S. Appl. No. 10/256,716; 12 pages.

Tsuk et al., U.S. Office Action mailed Jun. 24, 2005, directed to U.S. Appl. No. 10/256,716; 12 pages.

Tsuk et al., U.S. Office Action mailed Sep. 30, 2004, directed to U.S. Appl. No. 10/256,716; 11 pages.

Tsuk et al., U.S. Office Action mailed Jul. 7, 2009, directed to U.S. Appl. No. 11/610,190; 24 pages.

Robbin et al., U.S. Office Action mailed Jan. 18, 2007, directed to U.S. Appl. No. 10/259,159; 18 pages.

Robbin et al., U.S. Office Action mailed Oct. 13, 2006, directed to U.S. Appl. No. 10/259,159; 18 pages.

Robbin et al., U.S. Office Action mailed Aug. 3, 2006, directed to U.S. Appl. No. 10/259,159; 15 pages.

Robbin et al., U.S. Office Action mailed Jan. 11, 2006, directed to U.S. Appl. No. 10/259,159; 15 pages.

Robbin et al., U.S. Office Action mailed Jun. 16, 2005, directed to U.S. Appl. No. 10/259,159; 16 pages.

Robbin et al., U.S. Office Action mailed Sep. 30, 2004, directed to U.S. Appl. No. 10/259,159; 14 pages.

Zadesky et al., U.S. Office Action mailed Jul. 9, 2008, directed to U.S. Appl. No. 10/643,256; 12 pages.

Zadesky et al., U.S. Office Action mailed Dec. 12, 2007, directed to U.S. Appl. No. 10/643,256; 11 pages.

Zadesky et al., U.S. Office Action mailed Jul. 13, 2007, directed to U.S. Appl. No. 10/643,256; 13 pages.

Zadesky et al., U.S. Office Action mailed Mar. 23, 2007, directed to U.S. Appl. No. 10/643,256; 11 pages.

Zadesky et al., U.S. Office Action mailed Oct. 27, 2006, directed to U.S. Appl. No. 10/643,256; 14 pages.

Forsblad et al., U.S. Office Action mailed Jun. 25, 2009, directed to U.S. Appl. No. 11/355,022; 18 pages.

Forsblad et al., U.S. Office Action mailed Jan. 26, 2009, directed to U.S. Appl. No. 11/355,022; 15 pages.

Forsblad et al., U.S. Office Action mailed Jan. 27, 2009, directed to U.S. Appl. No. 11/882,421; 15 pages.

Zadesky et al., U.S. Office Action mailed Aug. 6, 2009, directed to U.S. Appl. No. 11/057,050; 30 pages.

Zadesky et al., U.S. Office Action mailed Feb. 20, 2009, directed to U.S. Appl. No. 11/057,050; 25 pages.

Zadesky et al., U.S. Office Action mailed Dec. 24, 2008, directed to U.S. Appl. No. 11/057,050; 25 pages.

Zadesky et al., U.S. Office Action mailed Nov. 26, 2008, directed to U.S. Appl. No. 11/057,050; 25 pages.

Zadesky et al, U.S. Office Action mailed Aug. 19, 2008, directed to U.S. Appl. No. 11/057,050; 23 pages.

Zadesky et al., U.S. Office Action mailed Nov. 20, 2007, directed to U.S. Appl. No. 11/057,050; 33 pages.

Zadesky et al., U.S. Office Action mailed Mar. 5, 2009, directed to U.S. Appl. No. 11/477,469; 12 pages.

Zadesky et al., U.S. Office Action mailed Jul. 30, 2004, directed to U.S. Appl. No. 10/188,182; 8 pages.

Zadesky et al., U.S. Office Action mailed Sep. 21, 2005, directed to U.S. Appl. No. 10/188,182; 10 pages.

Zadesky et al., U.S. Office Action mailed Mar. 4, 2004, directed to U.S. Appl. No. 10/188,182; 8 pages.

Zadesky et al., U.S. Office Action mailed Oct. 4, 2007, directed to U.S. Appl. No. 11/386,238; 12 pages.

Zadesky et al.., U.S. Office Action mailed Oct. 4, 2007, directed to U.S. Appl. No. 11/806,957; 14 pages.

Marriott et al., U.S. Office Action mailed Jan. 30, 2008, directed to U.S. Appl. No. 10/722,948; 17 pages.

Marriott et al., U.S. Office Action mailed Jul. 13, 2007, directed to U.S. Appl. No. 10/722,948; 15 pages.

Marriott et al., U.S. Office Action mailed Dec. 12, 2006, directed to U.S. Appl. No. 10/722,948; 14 pages.

Marriott et al., U.S. Office Action mailed Jun. 2, 2006, directed to U.S. Appl. No. 10/722,948; 12 pages.

Hotelling et al., U.S. Office Action mailed Jul. 24, 2009, directed to U.S. Appl. No. 11/483,008; 17 pages.

Hotelling et al., U.S. Office Action mailed Jul. 27, 2009, directed to U.S. Appl. No. 11/882,420; 17 pages.

Elias et al., U.S. Office Action mailed Aug. 4, 2009, directed to U.S. Appl. No. 11/203,692; 12 pages.

Elias et al., U.S. Office Action mailed Feb. 23, 2009, directed to U.S. Appl. No. 11/203,692; 13 pages.

Elias et al., U.S. Office Action mailed Sep. 17, 2008, directed to U.S. Appl. No. 11/203,692; 8 pages.

Tsuk et al., U.S. Office Action mailed Aug. 6, 2010, directed to U.S. Appl. No. 11/610,190; 30 pages.

Zadesky et al., U.S. Office Action mailed Aug. 2, 2010, directed to U.S. Appl. No. 11/882,004; 9 pages.

Marriott et al., U.S. Office Action mailed Aug. 19, 2010, directed to U.S. Appl. No. 11/882,422; 13 pages.

Hotelling, U.S. Office Action mailed Aug. 18, 2010, directed to U.S. Appl. No. 11/882,424; 16 pages.

Bull, U.S. Office Action mailed Jul. 9, 2010, directed to U.S. Appl. No. 11/849,801; 13 pages.

Tsuk et al., U.S. Office Action mailed Nov. 1, 2010, directed to U.S. Appl. No. 11/959,918; 9 pages.

Tsuk et al., U.S. Office Action mailed Oct. 26, 2010, directed to U.S. Appl. No. 11/959,942; 27 pages.

Robbin et al., U.S. Office Action mailed Oct. 29, 2010, directed to U.S. Appl. No. 11/838,845; 8 pages.

Ng et al., U.S. Office Action mailed Oct. 26, 2010, directed to U.S. Appl. No. 11/882,423; 18 pages.

Zadesky et al., U.S. Office Action mailed Oct. 4, 2010, directed to U.S. Appl. No. 11/057,050; 31 pages.

McKillop et al., U.S. Office Action mailed Sep. 16, 2010, directed to U.S. Appl. No. 11/591,752; 14 pages.

Zadesky et al., U.S. Office Action mailed Sep. 29, 2010, directed to U.S. Appl. No. 11/882,003; 13 pages.

Hotelling, U.S. Office Action mailed Oct. 1, 2010, directed to U.S. Appl. No. 11/482,286; 28 pages.

Hotelling et al., U.S. Office Action mailed Oct. 27, 2010, directed to U.S. Appl. No. 11/483,008; 23 pages.

Weber et al., U.S. Office Action mailed Oct. 13, 2010, directed to U.S. Appl. No. 12/205,795; 15 pages.

Tsuk et al., U.S. Office Action mailed Aug. 7, 2009, directed to U.S. Appl. No. 11/610,181; 20 pages.

Robbin et al., U.S. Office Action mailed Aug. 10, 2009, directed to U.S. Appl. No. 11/610,376; 11 pages.

Robbin et al., U.S. Office Action mailed Aug. 12, 2009, directed to U.S. Appl. No. 11/610,384; 20 pages.

Hotelling, U.S. Office Action mailed Sep. 1, 2009, directed to U.S. Appl. No. 11/482,286; 14 pages.

Lampell, U.S. Office Action mailed Sep. 15, 2009, directed to U.S. Appl. No. 11/530,807; 15 pages.

Boling, Douglas (1993) "Programming Microsoft Windows CE.NET," p. 109.

* cited by examiner

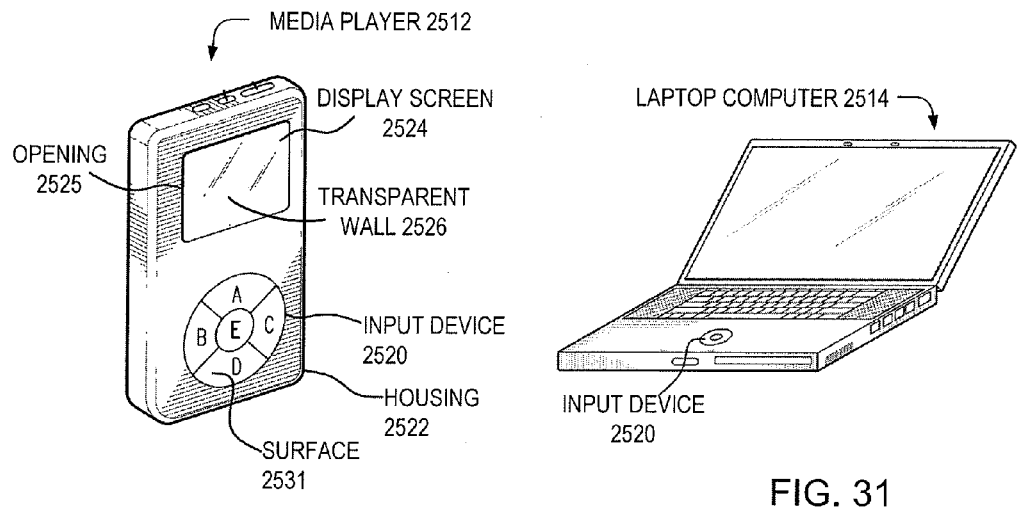
FIG. 30
FIG. 31
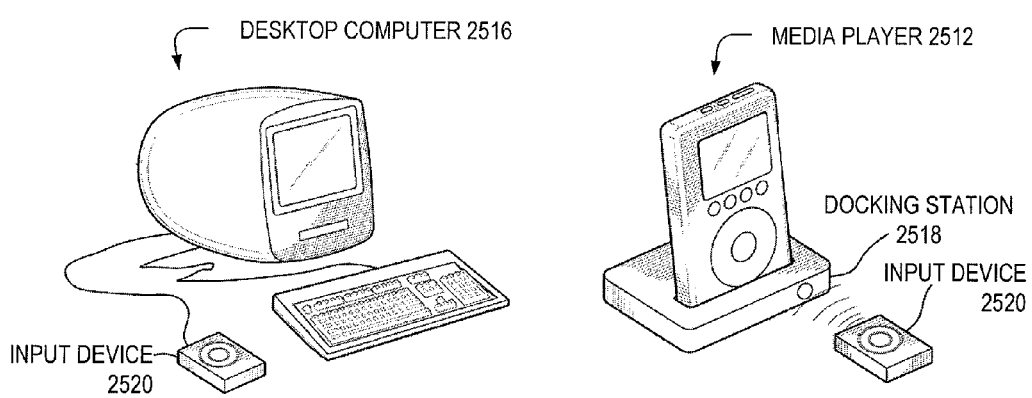
FIG. 32
FIG. 33

INTEGRATED CONTACT SWITCH AND TOUCH SENSOR ELEMENTS

CROSS REFERENCE TO RELATED APPLICATION

This claims priority under 35 USC 119(e) to U.S. Provisional Application No. 61/138,524, filed Dec. 17, 2008, and U.S. Provisional Application No. 61/165,188, filed Mar. 31, 2009, the entireties of which are incorporated herein by reference.

FIELD OF THE DISCLOSURE

This relates generally to input devices, including input devices with shared contact switch and touch sensor lines.

BACKGROUND

Several kinds of input devices exist for performing operations in an electronic device. Some examples of input devices include buttons, switches, keyboards, mice, trackballs, touch pads, joy sticks, touch screens and the like. Some examples of electronic devices include media players, remote controls, personal digital assistants (PDAs), cellular phones, etc. Operations performed by the input devices generally include moving a cursor or highlighted portions of a display and selecting displayed items.

As electronic devices have evolved, they have tended to decrease in size and provide increased features. Their decreasing size can impact the space available for input devices and power sources, such as batteries for example, to support the increased features. Accordingly, the design of input devices for electronic devices can be constrained by efforts to decrease the overall size of the electronic device and conserve a limited supply of power.

SUMMARY

An input device is disclosed that provides integrated contact switch and touch sensor elements. By integrating a contact switch and touch sensor so that they share a common sensor line, the input device can achieve space and cost savings over those that utilize distinct sensor lines for each of its sensor elements, and increased manufacturing throughput time.

For example, contact switch and touch sensor elements can be scanned by a controller to detect whether an input sensed by those elements has occurred. To enable this scanning, a sensor line associated with both the contact switch element and the touch sensor element can be connected to the controller through the controller's pins. The pins act as an interface through which the controller can scan the sensor elements.

By configuring a contact switch and touch sensor to share a common sensor line, a controller can use a single pin to scan both the contact switch and touch sensor elements, rather than using distinct pins to scan distinct sensor lines associated with each sensor element. By using fewer pins to scan the same number of sensor elements, a smaller controller can be used, which can reduce the size and cost of the input device, and increase manufacturing throughput time associated with the input device.

The ways in which the controller can be configured to detect input sensed by the integrated contact switch and touch sensor may be widely varied. Since sensor readings associated with the contact switch element can adversely affect sensor readings associated with the touch sensor element due to the use of a common sensor line, the controller can be configured to compensate for these adverse effects. Additionally, the controller's scan cycle can be optimized to account for the common sensor line configuration.

BRIEF DESCRIPTION OF THE DRAWINGS

FIGS. 30-33 illustrate examples of applications of input devices.

DETAILED DESCRIPTION

The present disclosure describes embodiments of an input device with shared contact switch and touch sensor lines. By integrating a contact switch and touch sensor so that they share a common sensor line, the input device can achieve space, cost and manufacturing savings over those that utilize distinct sensor lines for each of its sensor elements.

Figure 1:
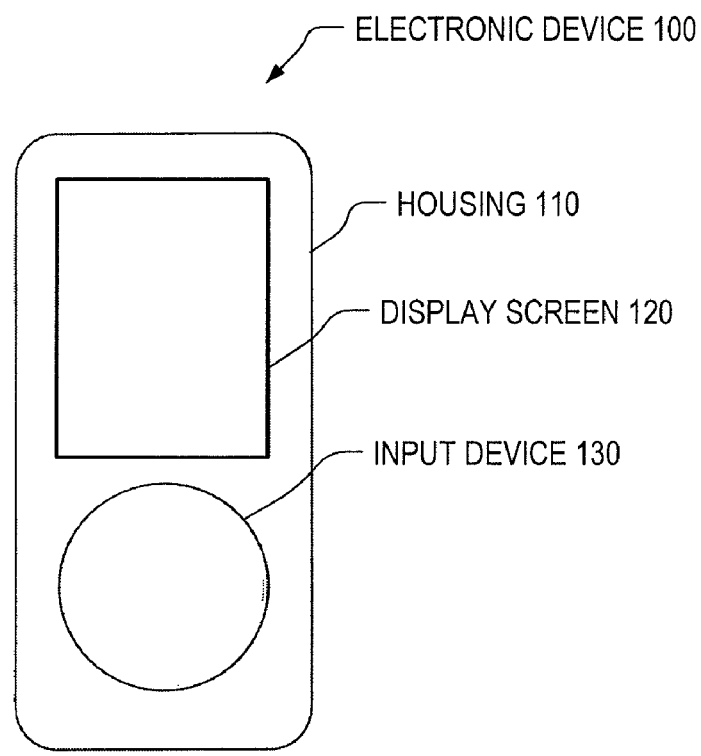
FIG. 1 illustrates an example of an electronic device.

FIG. 1 illustrates an example of an electronic device. The electronic device may be any consumer electronic product. The electronic device may be a computing device and more particularly it may be a media player, PDA, phone, remote control, camera and the like. In the embodiment illustrated in FIG. 1, electronic device 100 may correspond to a media player. The term "media player" generally refers to computing devices for processing media, such as audio, video or other images, including, for example, music players, game players, video players, video recorders and the like. These devices can be portable to allow a user to, for example, listen to music, play games or video, record video or take pictures wherever the user travels. In one embodiment, the electronic device can be a handheld device that is sized for placement into a pocket of the user. By being pocket sized, the device may be taken almost anywhere the user travels (e.g., the user is not limited by carrying a large, bulky and often heavy device, as in a portable computer). Furthermore, the device can be operated in the user's hands, thus no reference surface such as a desktop is required.

Electronic devices (e.g., media players) generally have connection capabilities that allow a user to upload and download data to and from a host device, such as a general purpose computer (e.g., desktop computer, portable computer, etc.). For example, in the case of a camera, photo images can be downloaded to the general purpose computer for further processing (e.g., printing). With regard to music players, for example, songs and play lists stored on the general purpose computer can be downloaded into the music player. In the embodiment illustrated in FIG. 1, electronic device 100 can be a pocket-sized hand-held media player (e.g., MP3 player) that allows a user to store a collection of music, photos, album art, contacts, calendar entries, and other desirable media assets. It should be appreciated however, that media players are not a limitation as the electronic device may be embodied in other forms as mentioned above.

As shown in FIG. 1, electronic device 100 may include housing 110 that can enclose various electrical components, such as integrated circuit chips and other circuitry, for example. The integrated circuit chips and other circuitry may include, for example, a microprocessor, memory (e.g., ROM, RAM), a power supply (e.g., battery), a circuit board, a hard drive or Flash (e.g., Nand flash) for storing media for example, one or more orientation detection elements (e.g., accelerometer) and various input/output (I/O) support circuitry. In the case of music players, the electrical components can include components for outputting music such as an amplifier and a digital signal processor (DSP) for example. In the case of video recorders or cameras the electrical components can include components for capturing images such as image sensors (e.g., charge coupled device (CCD) or complimentary oxide semiconductor (CMOS)) or optics (e.g., lenses, splitters, filters) for example. In addition to the above, the housing can also define the shape or form of the electronic device. That is, the contour of housing 102 may embody the outward physical appearance of electronic device 100 in one embodiment.

Electronic device 100 may also include display screen 120. Display screen 120 can be used to display a graphical user interface as well as other information to the user (e.g., text, objects, graphics). For example, display screen 120 may be a liquid crystal display (LCD). In one embodiment, the display screen can correspond to a X-by-Y pixel high-resolution display, with a white LED backlight to give clear visibility in daylight as well as low-light conditions. Display screen 120 can also exhibit a "wide screen" aspect ratio (e.g., similar to a 16:9 aspect ratio) such that it may be relatively easy to perceive portrait and landscape orientations.

Electronic device 100 may also include input device 130. Input device 130 can be configured to provide one or more control functions for controlling various applications associated with electronic device 100. For example, a control function can be used to move an object or perform an action on display screen 120 or to make selections or issue commands associated with operating electronic device 100. Input device 130 may be widely varied. In one embodiment, input device 130 may include a combination of a rigid sensor mechanism and one or more movable sensor mechanisms for detecting input. The rigid sensor mechanism can include, for example, a touch sensitive surface that provides location information for an object, such as a finger for example, in contact with or in proximity to a touch sensor element associated with the touch sensitive surface. The movable sensor mechanism can include, for example, one or more moving members comprising contact switch elements that actuate a switch when a particular area of input device 130 is pressed. The movable sensor mechanism may operate as a mechanical push button and perform a clicking action when actuated.

Figure 2:
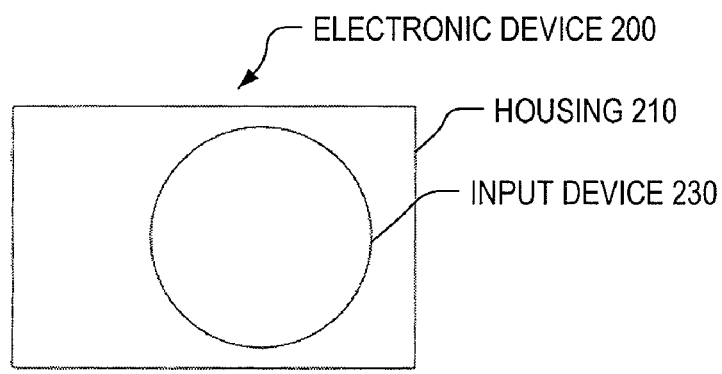
FIG. 2 illustrates an example of an electronic device.

FIG. 2 illustrates an embodiment of an electronic device without a display screen. In the embodiment illustrated in FIG. 2, electronic device 200 may include housing 210 that may generally correspond to housing 110, and input device 230 that may generally correspond to input device 130. The lack of a display screen allows electronic device 200 to be configured with smaller dimensions than those of electronic device 100. For example, in one embodiment, electronic device 200 may be less than two inches wide and less than two inches tall.

Figure 3:
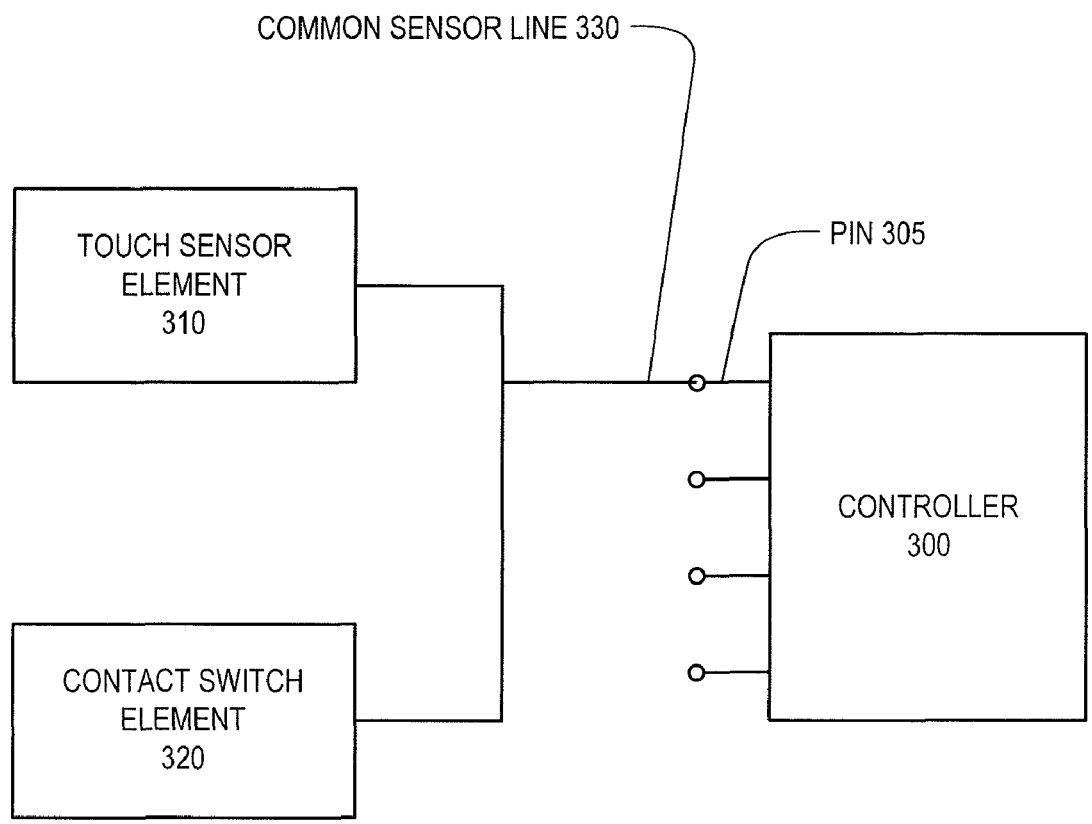
FIG. 3 illustrates an example of an integrated contact switch and touch sensor configuration.

FIG. 3 illustrates an example of an integrated contact switch and touch sensor configuration. Touch sensor element 310 and contact switch element 320 can share common sensor line 330. Common sensor line 330 can connect to pin 305 of controller 300, which can be configured to scan the common sensor line to detect an input associated with touch sensor element 310 or contact switch element 320.

Figure 4:
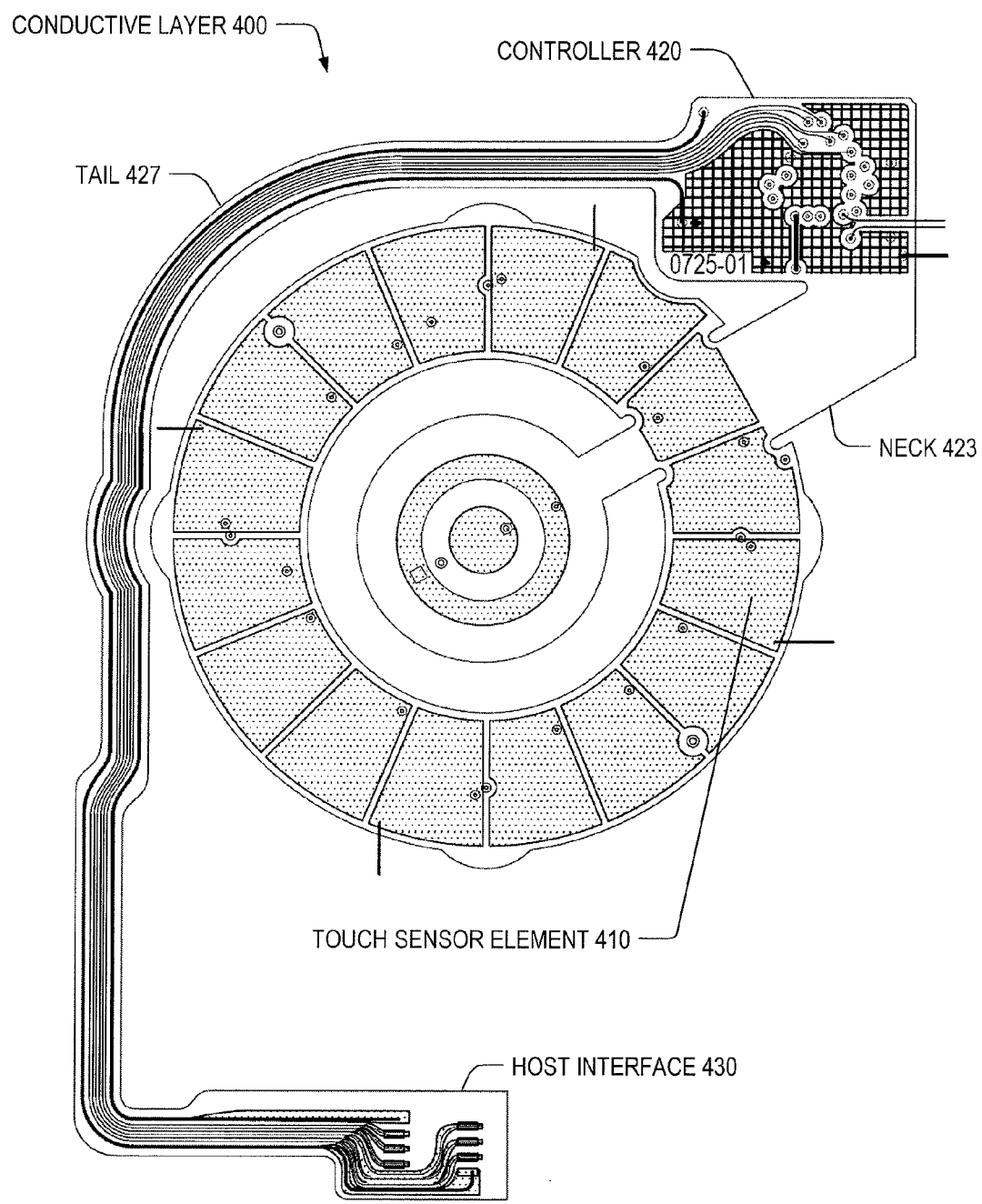
FIG. 4 illustrates an example of a first conductive layer of an input device.
Figure 7:
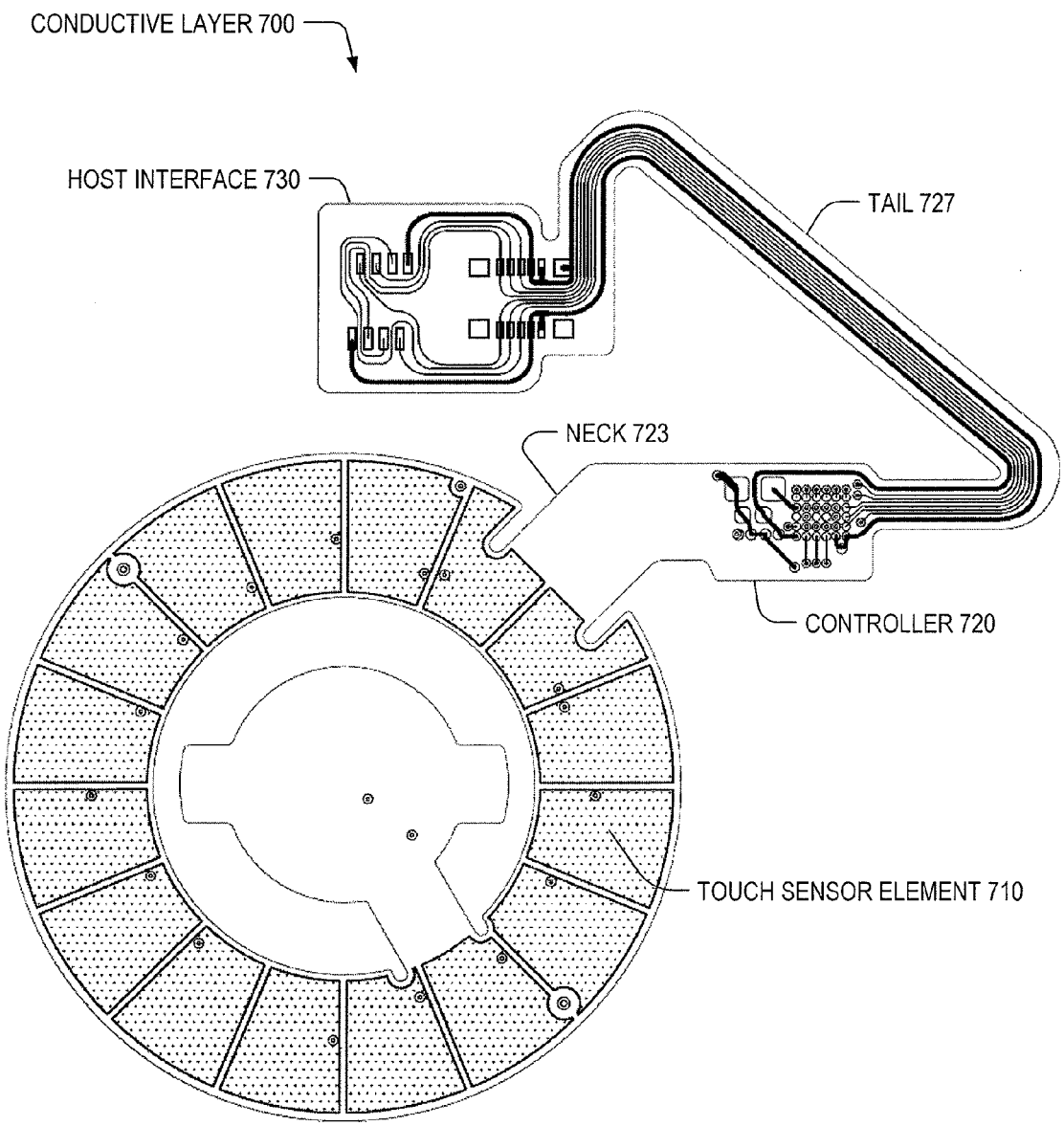
FIG. 7 illustrates an example of a first conductive layer of an input device.
Figure 22:
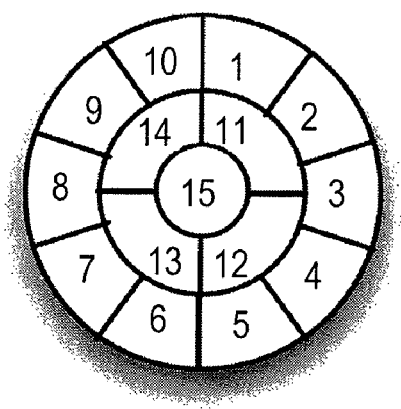
FIG. 22 illustrates an example of a 15-element capacitive sensor element arrangement.
Figure 23:
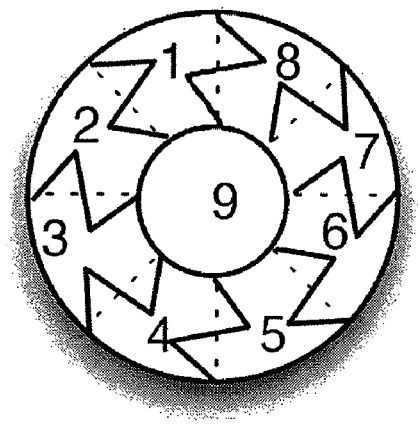
FIG. 23 illustrates an example of a 9-element capacitive sensor element arrangement.
Figure 24:
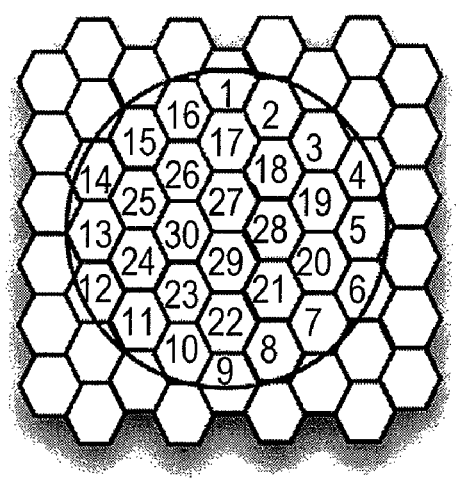
FIG. 24 illustrates an example of 30-element capacitive sensor element arrangement.

The arrangement of touch sensor element 310 and contact switch element 320 may be widely varied. For example, FIGS. 4, 7 and 22-24 illustrate examples of some arrangements of capacitive touch sensor elements that can be configured to sense touch events caused by an object, such as a finger, in contact with or in proximity to a touch sensitive surface of an input device corresponding to the embodiments described above. FIGS. 4 and 7 illustrate examples of 16-element arrangements. FIG. 22 illustrates an example of a 15-element arrangement. FIG. 23 illustrates an example of a 9-element arrangement. FIG. 24 illustrates an example of a 30-element element arrangement. As illustrated in the embodiments of FIGS. 4, 7 and 22-24, the touch sensor elements according to the teachings of the present disclosure may comprise any suitable shape or pattern (e.g., annular, honeycombed, zigzagged, etc.)

Touch events detectable by the touch sensor elements of the input device may be widely varied, and may include, for example, rotational motion, linear motion, taps, holds, and other gestures and any combination thereof provided by one (single touch input) or more than one (multi-touch input) of a user's fingers across the touch sensitive surface. The touch sensor elements can be configured to detect touch input based on self capacitance (as illustrated in FIGS. 4, 7 and 25-24) or mutual capacitance. In self capacitance, the "self" capacitance of a single electrode is measured as for example relative to ground. In mutual capacitance, the mutual capacitance between at least first and second electrodes is measured. In either case, each of the sensor elements can work independent of the other sensor elements to produce simultaneously occurring signals representative of different points of input on the touch sensitive surface at a particular time. Touch input sensed by the touch sensor elements of the input device may be widely varied, and may include, for example, touches and near-touches (that is, proximate but without actual contact) of a surface of the input device. The input device can include a controller (e.g., controller 300) configured to detect touch input by measuring a change in capacitance of the sensor elements.

FIGS. 6, 9, 11 and 13 illustrate examples of contact switch element arrangements. Push button input sensed by the contact switch elements of the input device may be widely varied, and may include, for example, push button presses and push button holds caused by pressure applied and/or released by a user's finger in a push button area of the input device. The controller described above (e.g., controller 300) can also be configured to detect input sensed by the contact switch elements. The ways in which push button input can be detected may be widely varied. For example, in one embodiment the controller can detect push button input by sensing a short circuit caused by a contact of contact switch elements in response to pressure applied to the push button area of the input device beyond a threshold level. In another embodiment, the controller can detect push button input by sensing a level of capacitance beyond a threshold amount.

The present disclosure is not limited to the input devices illustrated herein. Rather, an input device of any suitable technology or configuration for enabling detection of input in accordance with the teachings of the present disclosure can be utilized. For the purposes of the following discussion in connection with the embodiments illustrated in FIGS. 4-21, the input device can comprise capacitive touch sensor elements and contact switch elements forming mechanical push buttons arranged on different surfaces of a substrate, such as a flexible printed circuit board ("flex") for example.

The flex can comprise three conductive layers—a top, middle and bottom conductive layer for example. The top conductive layer can comprise conducting pad electrodes forming capacitive touch sensor elements, the bottom conductive layer can comprise a conducting surface forming a ground plane around conducting elements forming contact switch elements, and the middle conductive layer can comprise traces connecting the controller to the capacitive touch sensor elements, the contact switch elements and the ground plane.

The flex can comprise a multi-layer substrate, and the conductive layers can be arranged on a surface of one or both sides of the substrate layers. In one embodiment, the conductive layer can comprise a copper layer coated on a substrate layer, which can be etched to form the appropriate sensor element and/or ground plane and then glued to another similar substrate layer.

Each of the substrate layers can comprise a dielectric material to separate the conductive layers. The dielectric material can be formed of a polyamide or other plastic for example. The traces can comprise sensor lines and connect the controller to the sensor elements through vias formed in the substrate layers and filled with conductive material. An advantage of routing traces and forming contact switch elements in one or more conductive layers different than the conductive layer forming the capacitive touch sensor elements can be to reduce parasitic capacitance, which can reduce the performance of the capacitance touch sensor elements.

Figure 5:
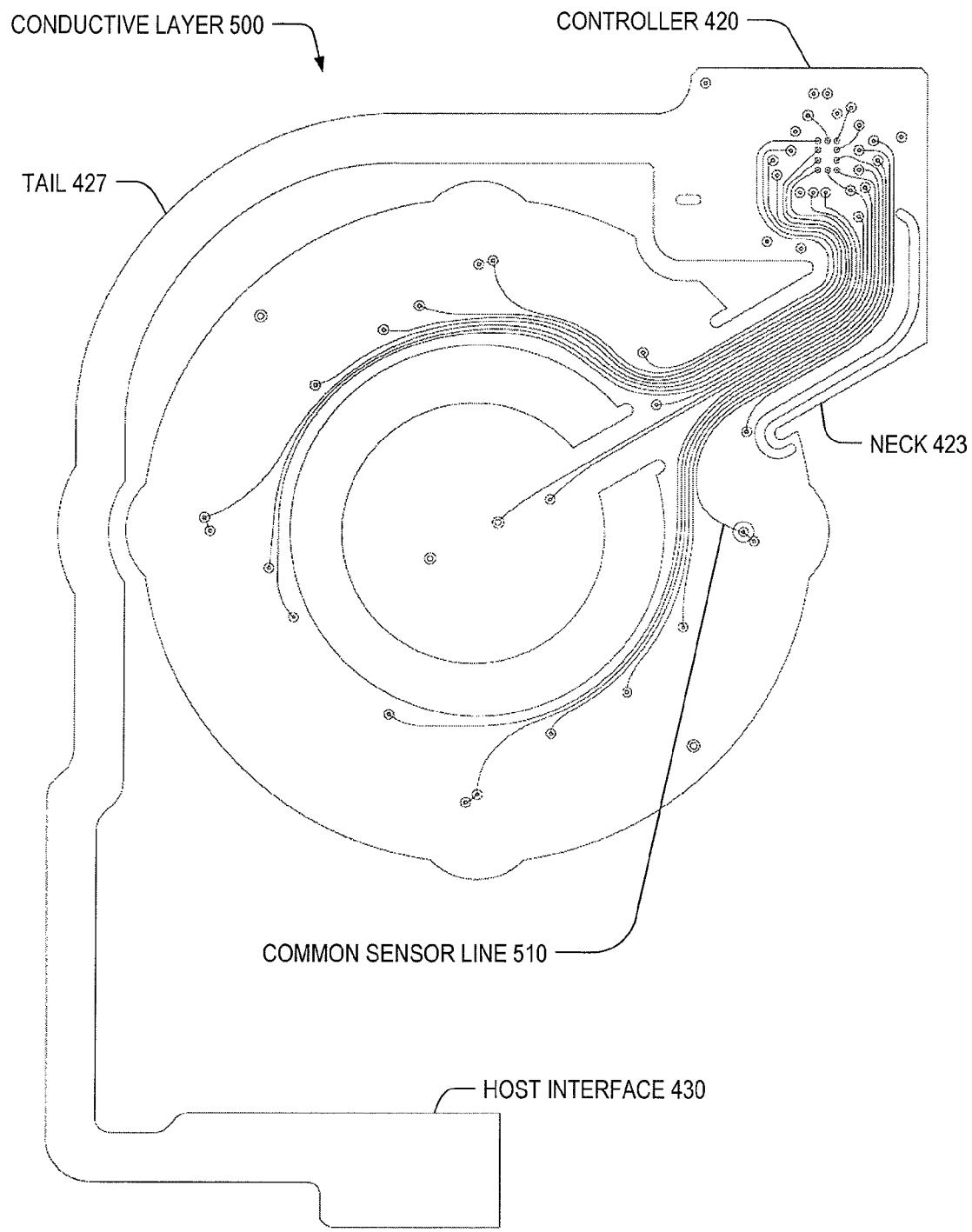
FIG. 5 illustrates an example of a second conductive layer of an input device.
Figure 6:
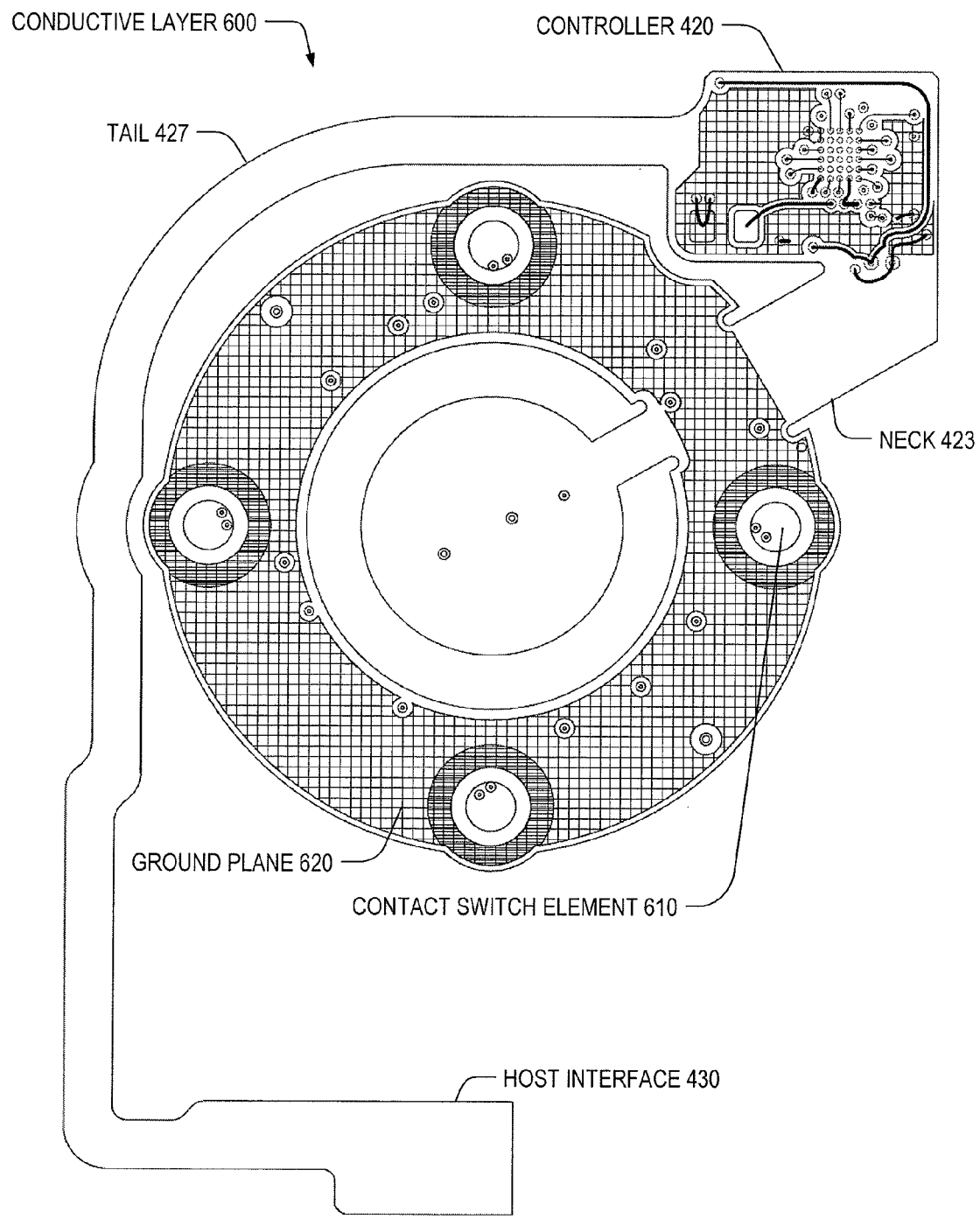
FIG. 6 illustrates an example of a third conductive layer of an input device.

FIGS. 4-6 illustrate an embodiment of a flex comprising an integrated contact switch and touch sensor configuration in accordance with the teachings of the present disclosure. FIG. 4 illustrates conductive layer 400 of the flex in which 16 touch sensor elements and a contact switch element of one contact switch can be formed. The 16 touch sensor elements can include touch sensor element 410, and comprise pad electrodes circumferentially arranged about the center of the flex. The contact switch can be centrally arranged on the flex. The input device can include neck 423 to allow the flex to connect to controller 420, and tail 427 to allow controller 420 to connect to host interface 430. Host interface 430 can be configured to connect the input device to a main processor or circuit board of a host electronic device. In one embodiment, traces arranged on neck 423 and tail 427 can be formed in only conductive layer 400 and associated with only one substrate layer to increase the flexibility of the neck and tail portions of the input device, which can be advantageous for assembly of the input device into the host electronic device. In other embodiments, the traces arranged on neck 423 and tail 427 can be formed in other and/or different conductive layers and associated with more than one substrate layer.

FIG. 6 illustrates conductive layer 600 of the flex in which ground plane 620 and a contact switch element associated with each of 4 contact switches, including contact switch element 610, can be formed. In the illustrated embodiment, each contact switch can constitute a dome switch comprising 2 contact switch elements configured to make contact to actuate the switch. At least one contact switch element of each of the four dome switches can be formed in conductive layer 600, and can be arranged in proximity to the touch sensor element with which it is integrated, such as on opposite sides of the flex from its corresponding touch sensor element for example. FIG. 5 illustrates conductive layer 500 of the flex comprising a trace layer in which sensor lines connecting the touch sensor elements and the contact switch elements through via holes can be routed to controller 420.

FIG. 5 also illustrates the integration of the contact switch elements and touch sensor elements formed near one another on the flex. Common sensor line 510 illustrates an exemplary integration of contact switch element 610 and touch sensor element 410. By connecting contact switch element 610 and touch sensor element 410 in this manner, controller 420 can utilize one pin to detect a touch input via touch sensor element 410 and a push button input via contact switch element 610. This configuration can achieve space, cost and manufacturing savings, since controller 420 can be configured smaller to utilize only 16 pins, for detecting touch and push button input via the 16 touch sensor elements and 4 contact switch elements, rather than having 20 dedicated pins for each sensor element (e.g., 16 for each touch sensor element and 4 for each contact switch element).

Figure 8:
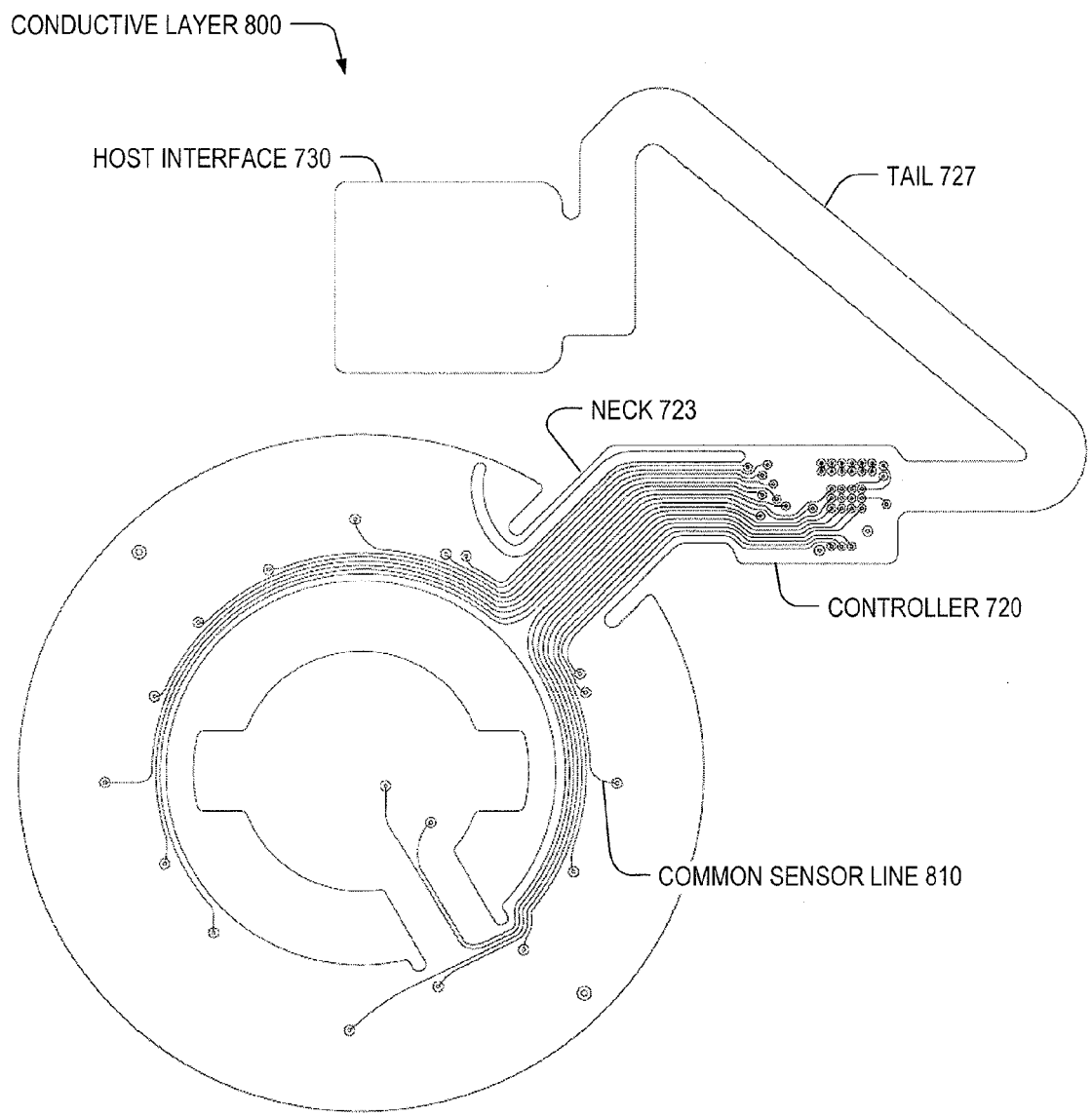
FIG. 8 illustrates an example of a second conductive layer of an input device.
Figure 9:
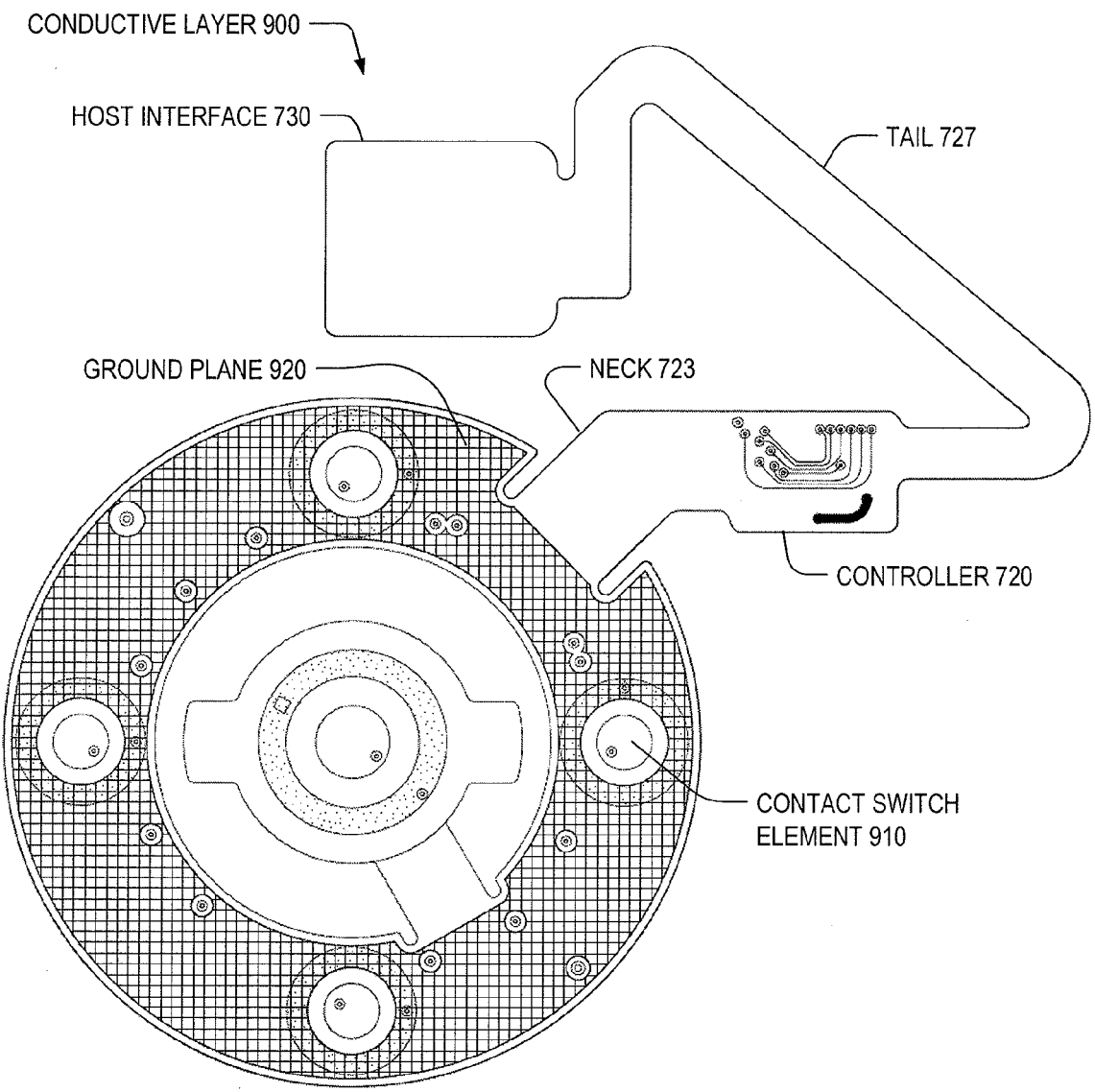
FIG. 9 illustrates an example of a third conductive layer of an input device.

FIGS. 7-10 illustrate another embodiment of a flex comprising an integrated contact switch and touch sensor configuration in accordance with the teachings of the present disclosure. Similar to FIG. 4, FIG. 7 illustrates conductive layer 700 of the flex in which 16 touch sensor elements including touch sensor element 710 can be formed, and controller 720, host interface 730, neck 723 and tail 727. Similar to FIG. 6, FIG. 9 illustrates conductive layer 900 of the flex in which a contact switch element associated with each of 4 contact switches, including contact switch element 900, can be formed in proximity to the touch sensor element with which it is integrated. Unlike the embodiment of the flex illustrated in FIGS. 4-7, which illustrate a centrally arranged contact switch in the same layer as the touch sensor elements, the embodiment of the flex illustrated in FIGS. 7-10 illustrates a centrally arranged contact switch in the same layer as ground plane 920.

Figure 10:
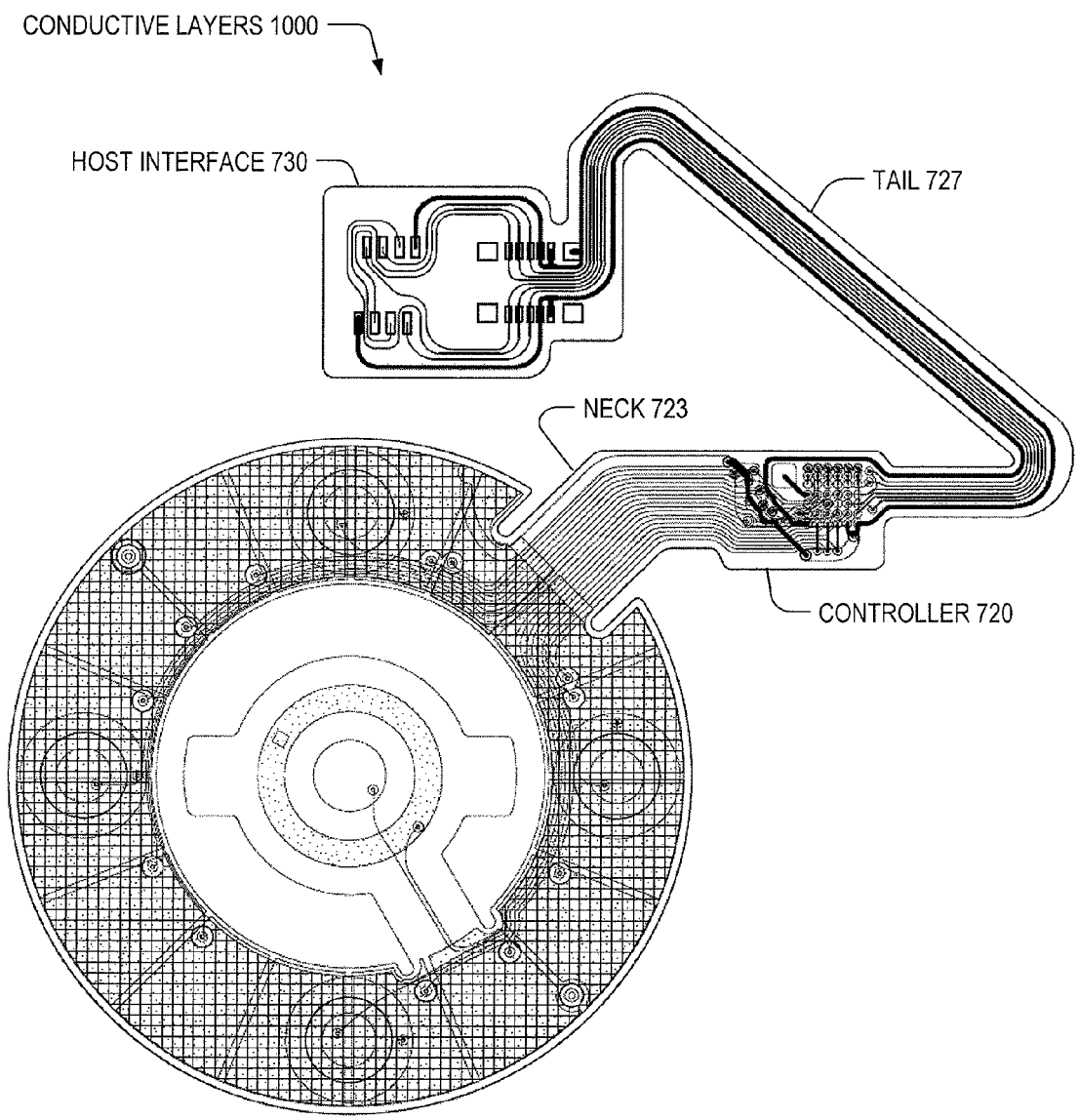
FIG. 10 illustrates an example of three conductive layers of an input device.

In the embodiment illustrated in FIGS. 7-10, at least one contact switch element of each of four dome switches can be formed in conductive layer 900, and can be arranged in proximity to the touch sensor element with which it is integrated, such as on opposite sides of the flex from its corresponding touch sensor element for example. Similar to FIG. 5, FIG. 8 illustrates conductive layer 800 of the flex comprising a trace layer in which sensor lines connecting the touch sensor elements and the contact switch elements through via holes can be routed to controller 720. Similar to FIG. 5, FIG. 8 illustrates the integration of contact switch elements with touch sensor elements formed near one another on the flex. Common sensor line 810 illustrates the integration of contact switch element 910 and touch sensor element 710. FIG. 10 illustrates conductive layers 1000, which comprise a composite view of conductive layers 700, 800 and 900 of the flex.

The configuration of the flex according to the teachings of the present disclosure can vary widely. For example, to normalize capacitance readings among the touch sensor elements, the size, shape and thickness of the touch sensor elements or the flex itself can be increased or decreased appropriately. For instance, the second flex embodiment illustrates a rotation of the touch sensor element arrangement relative to the touch sensor element arrangement of the first embodiment. By rotating the touch sensor element arrangement in this manner, a more uniform touch sensing element area can be achieved. In another embodiment, dummy sets of contact switch elements can be mounted to the flex near touch sensor elements that are not integrated with contact switch elements in the manner indicated above, in order to normalize any effect that the working contact switch elements may have on the capacitance between their corresponding touch sensor elements and ground. This effect may also be compensated for by the controller via calibration to normalize capacitance readings across the touch sensor elements. In a further embodiment, to reduce the thickness of the flex, the trace layer of the flex can be combined with the ground plane layer to form a two conductive layer, rather than a three conductive layer, flex. In this embodiment, the sensor lines can be formed to snake through the ground plane without contacting the conductive material forming the ground plane.

Figure 11:
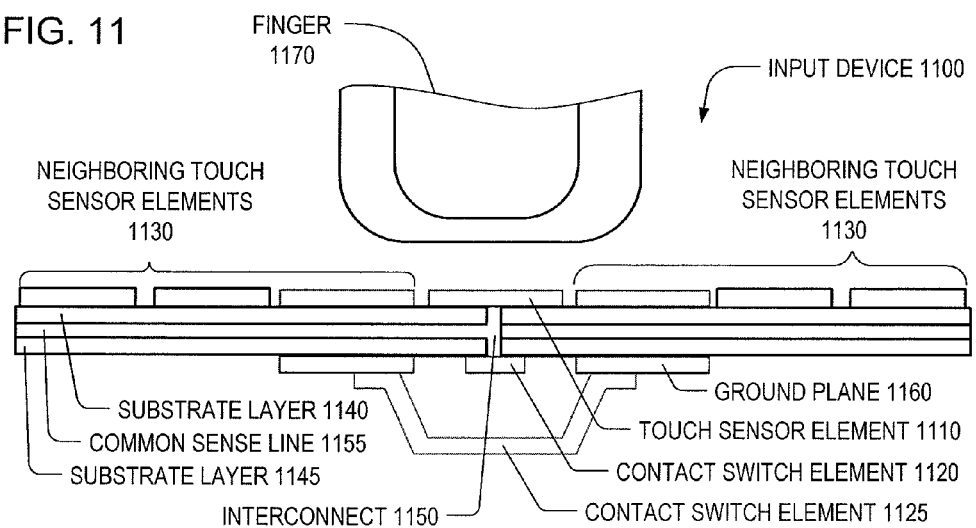
FIG. 11 illustrates an example configuration of an integrated contact switch and touch sensor.
Figure 13:
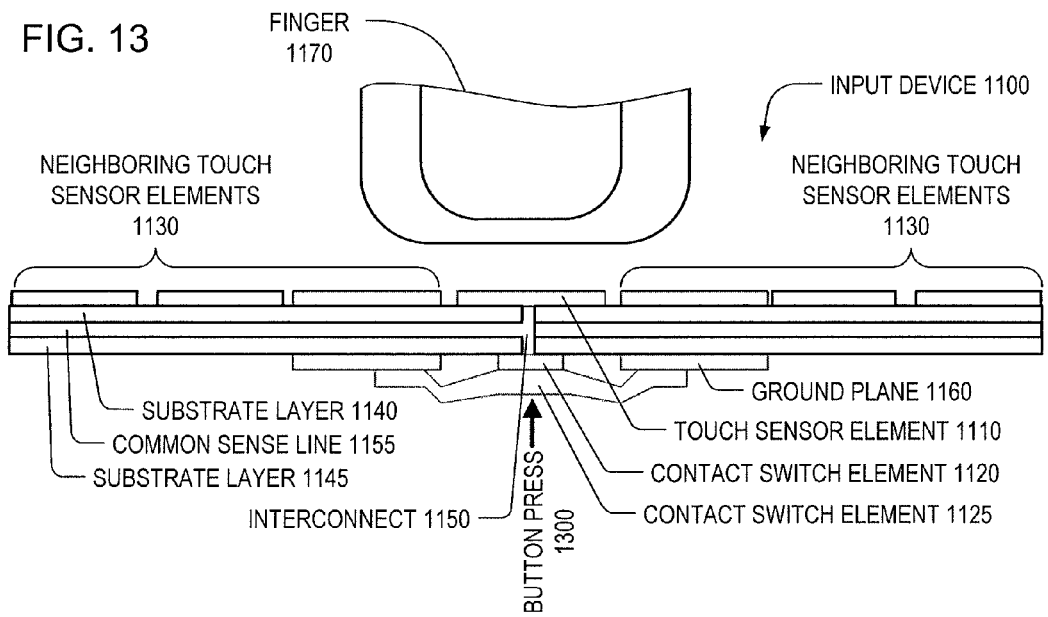
FIG. 13 illustrates an example configuration of an integrated contact switch and touch sensor.

FIGS. 11 and 13 illustrate an example of a configuration and operation of an integrated contact switch and touch sensor in input device 1100. FIG. 11 illustrates a configuration of the integrated contact switch and touch sensor in a non-pressed state. In the illustrated embodiment, the flex comprises a multi-layer substrate including substrate layer 1140 and substrate layer 1145. Touch sensor element 1110 and neighboring touch sensor elements 1130 can be arranged on a top surface of substrate layer 1140. Ground plane 1160 and contact switch element 1120 can be arranged on a bottom surface of substrate layer 1145. Contact switch element 1125 can be connected to ground plane 1160. A routing layer including common sense line 1155 can be arranged either on a bottom surface of substrate layer 1140, a top surface of substrate layer 1145, or on both surfaces.

Figure 12:
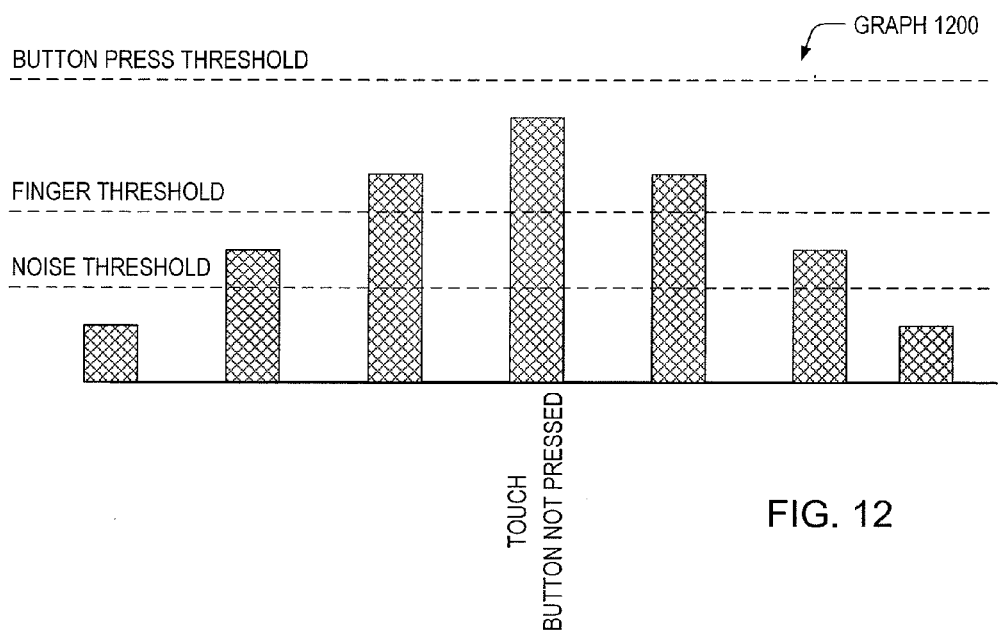
FIG. 12 illustrates an example operation of an integrated contact switch and touch sensor.

Contact switch element 1120 and touch sensor element 1110 can be connected to common sense line 1155 via interconnect 1150 formed though via holes in the flex. In particular, in the non-pressed state, touch sensor element 1110 can operate as if it were separately and distinctly connected to the controller. For example, FIG. 12 illustrates graph 1200 of capacitive reading measurements associated with touch sensor element 1110 and those of neighboring touch sensor elements 1130 during a scan cycle. The controller can detect that a touch input has occurred when the capacitance reading exceeds the finger threshold. This can be caused by finger 1170 contacting or hovering near touch sensor element 1110, for example.

FIG. 13 illustrates a configuration of the integrated contact switch and touch sensor in a pressed state in input device 1100. In the pressed state of the illustrated embodiment, button press 1300 can cause contact switch element 1125 to connect to contact switch element 1120. Since contact switch element 1125 is connected to ground plane 1160, the connecting of contact switch element 1125 to contact switch element 1120 can cause touch sensor element 1110, which is connected to contact switch element 1120 via interconnect 1150 and common sense line 1155, to be shorted to ground. The shorting to ground can cause a capacitive reading of zero or other appreciable drop in capacitance to be measured on the common sensor line. This situation is depicted in graph 1400 of FIG. 14, in which the absence of the center bar reflects a grounding of the common sensor line. In one embodiment, the controller can detect that a push button input has occurred when the capacitance reading is zero. This can be caused, for example, by a finger pressing the input device at a push button area such that the corresponding contact switch elements contact each other to cause the short. The dotted outline of the center bar can reflect a heightened capacitive reading on the common sensor line, prior to its grounding, reflecting a close proximity, but not connection, between contact switch element 1125 and contact switch element 1120 during button press 1300. This heightened capacitive reading reflects an increase in capacitance, beyond a button press threshold level, between ground plane 1160 and touch sensor element 1110 due to contact switch element 1125 being moved closer to ground plane 1160 during button press 1300.

Due to the nature of the common sensor line, the sensor readings associated with contact switch element 1120 in a pressed state can adversely affect sensor readings associated with touch sensor element 1110. For example, a capacitive reading of zero can falsely indicate that touch sensor element 1110 is inactive. A capacitive reading of zero can also falsely indicate, based on a centroid analysis of graph 1400, that two fingers are in contact with or near neighboring touch sensor elements 1130, rather than one finger being in contact with or near touch sensor element 1110. Further, a heightened capacitive reading as described above, which can occur during a push button input, can skew a centroid analysis performed to locate the position at which the touch input is applied to the input device. In particular, this skewing can occur due to the centroid analysis unnecessarily weighing the location of touch sensor element 1110, caused by the heightened capacitive reading that is not reflective of the proximity of a finger.

Figure 15:
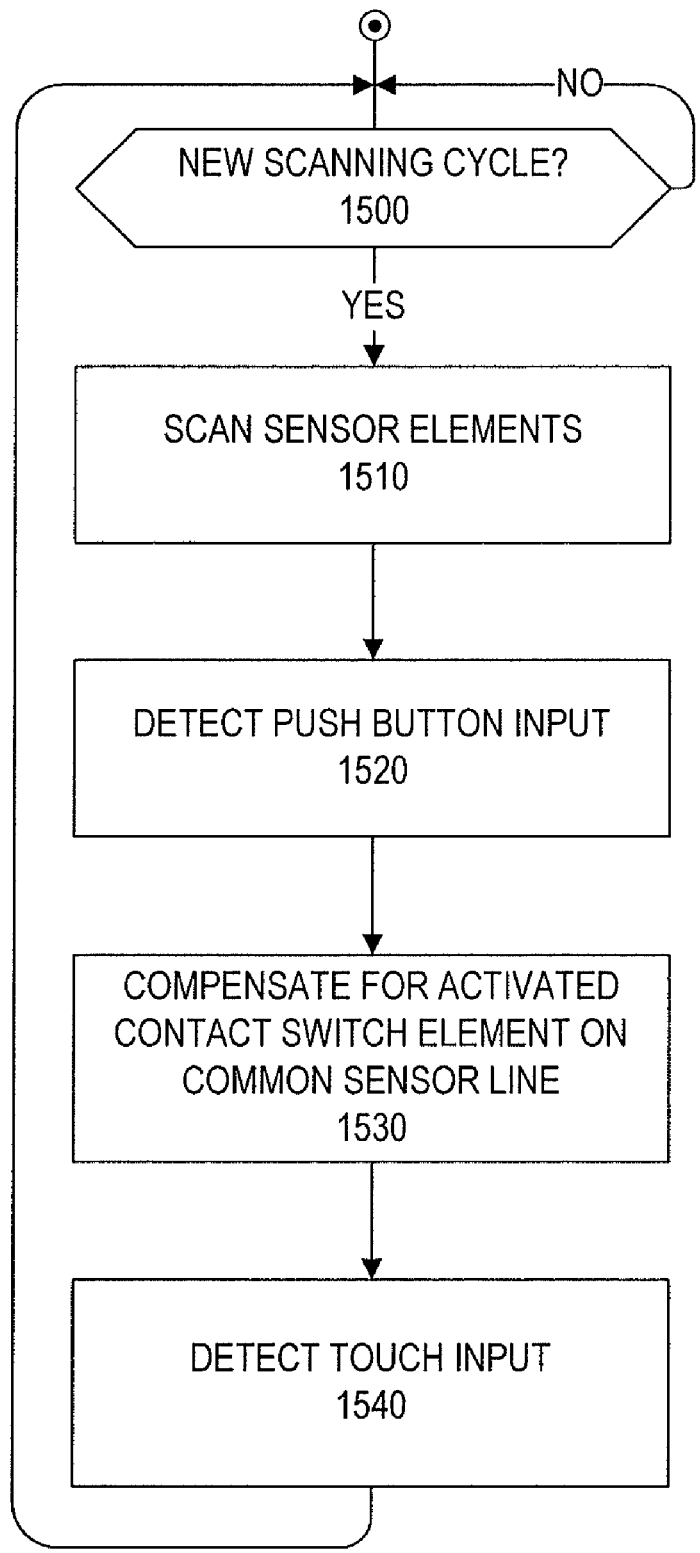
FIGS. 15-17 illustrate examples of scanning processes.
Figure 16:
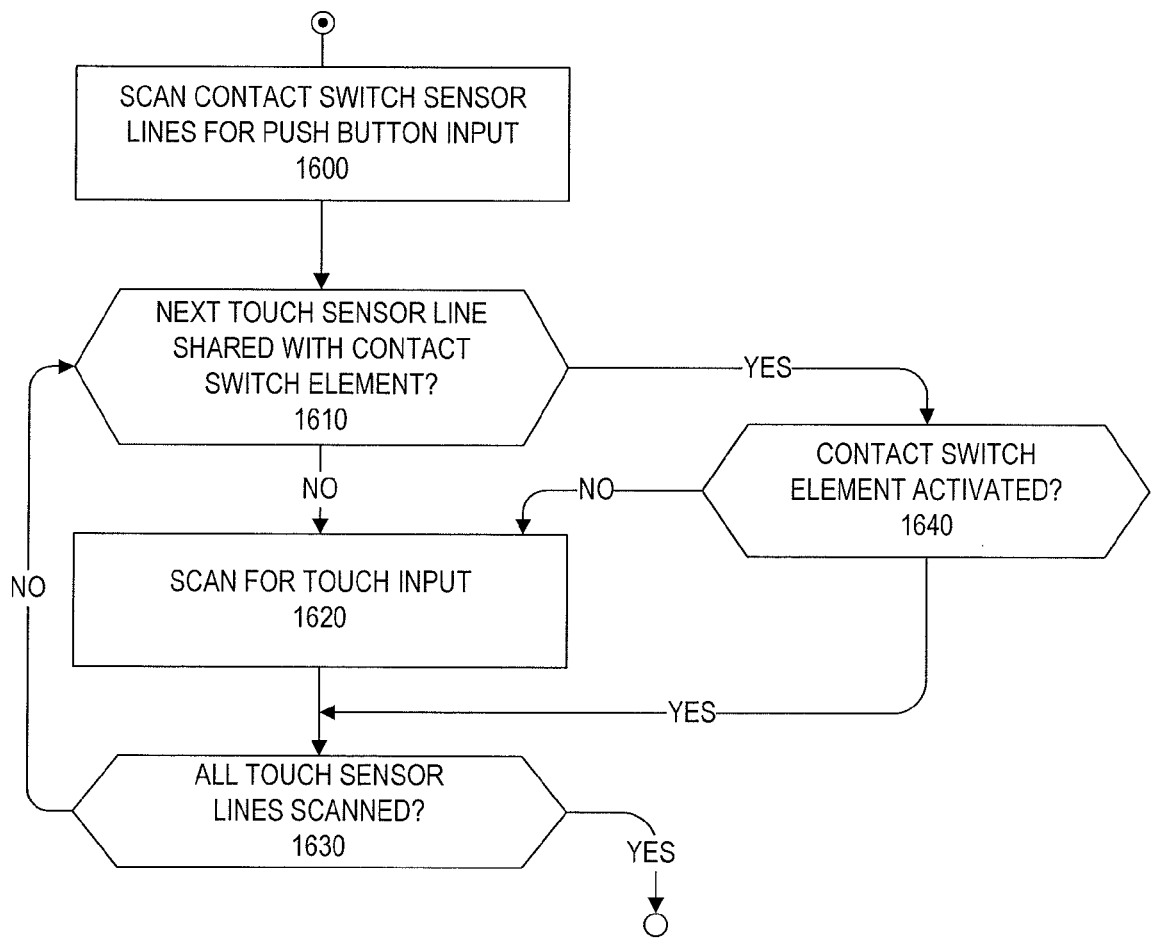
Figure 17:
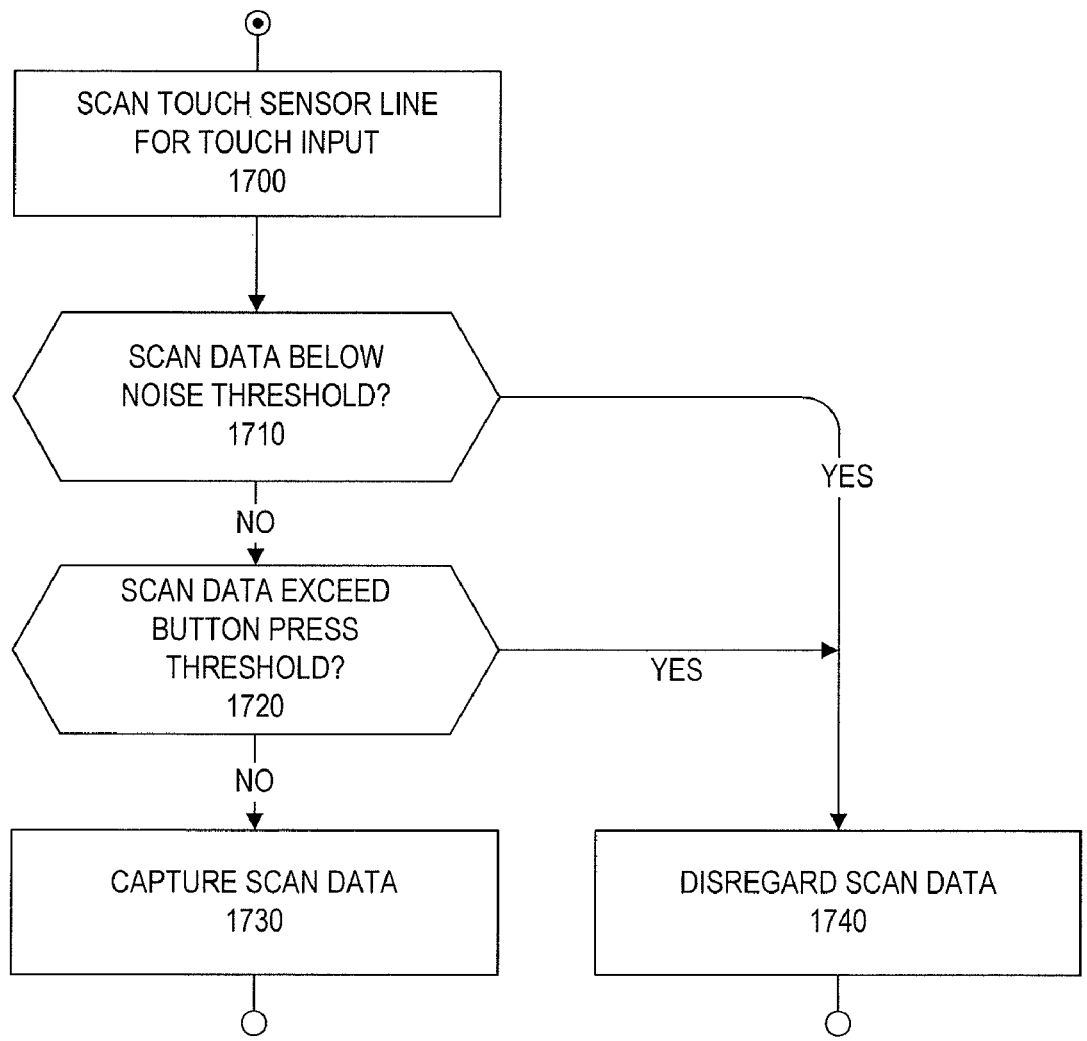

Accordingly, the controller can be configured to compensate for these adverse effects. FIGS. 15-17 illustrate examples of scanning processes that can compensate for these adverse effects FIG. 15 illustrates a scanning process by which the controller can scan the common sensor line to detect an input associated with the touch sensor element or the contact switch element associated with an integrated contact switch and touch sensor. During each scan cycle (block 1500), the controller can scan (block 1510) all of the sensor elements of the input device. For push button input, the controller can detect (block 1520) push button input based on the scan data. For touch input, the controller can compensate (block 1520) for a pressed state of any integrated contact switch and touch sensor in the input device, and subsequently detect (block 1500) touch input based on compensated scan data.

For example, the controller can compensate for the pressed state of an integrated contact switch and touch sensor by estimating scan data for the associated touch sensor element. The ways in which the controller can estimate the scan data can be widely varied. In one embodiment, for example, the controller can estimate scan data based on scan data associated with the particular touch sensor element from one or more previous scan cycles. In another embodiment, the controller can estimate scan data based on captured scan data associated with neighboring touch sensor elements, such as an average of the captured scan data associated with the neighboring touch sensor elements for example. By replacing the null scan data (due to the grounding of the common sensor line) with estimated scan data, the controller can utilize more reliable data to detect the occurrence and location, for example, of a touch input associated with the integrated contact switch and touch sensor.

It should be appreciated that the process described above is not limited to the particular order illustrated in FIG. 15. For example, push button inputs can be detected as each contact switch element is scanned, rather than after all contact switch elements are scanned.

The ways in which the controller can scan (block 1510) the sensor elements of an input device may be widely varied. For example, in one embodiment, the controller can scan, within each scan cycle, the sensor elements for push button input first, and the sensor elements for touch input second. In order to debounce the contact switch elements, the controller can subsequently scan the sensor elements for push button input a second time in the same scan cycle (e.g., near the end of the scan cycle).

Further, the controller can be configured to optimize the scan cycle to account for the common sensor line configuration of integrated contact switch and touch sensors. In one embodiment, the controller can skip scanning, within a scan cycle, all touch sensor lines when a push button input has been detected. In this embodiment, the controller can scan the contact switch sensor lines for push button input. If the controller determines that any contact switch element has been activated, the controller can skip scanning any further touch sensor lines for touch input during the remainder of the scan cycle. Otherwise, the controller can scan the touch sensor lines for touch input during the remainder of the scan cycle.

In another embodiment, as illustrated in FIG. 16, the controller can skip scanning, within a scan cycle, only the touch sensor lines shared with a contact switch element that has sensed a push button input. In this illustrated embodiment, the controller can scan (block 1600) the contact switch sensor lines for push button input. If the next touch sensor line is shared (block 1610) with a contact switch element, then the controller can determine (block 1640) whether the shared contact switch element has been activated. If the shared contact switch element has been pressed, the controller can skip scanning the touch sensor line for touch input. If the shared contact switch element has not been pressed, the controller can scan (block 1620) the touch sensor line for touch input. This can be repeated (block 1630) for each remaining touch sensor line in the scan cycle.

The embodiments described above in connection with optimizing the scan cycle can reduce the scanning time, and thus, power, associated with each scan cycle, since they involve selectively skipping certain scans.

In another embodiment of a scanning process, rather than scanning for push button inputs independently of scanning for touch inputs as described in an embodiment above (i.e., scanning for push button input first, and scanning for touch input second), the controller can determine whether to consecutively scan for push button input and touch input based on the particular sensor line that is next in line to be scanned. For example, in this embodiment during each scan cycle, the controller can determine whether the next sensor line to be scanned is connected to both a contact switch and touch sensor element. If the next sensor line is connected to both a contact switch and touch sensor element, the controller can scan for a push button input and for a touch input on that sensor line. If the next sensor line is not connected to both a contact switch and touch sensor element, the controller can scan only for a touch input on that sensor line.

Figure 14:
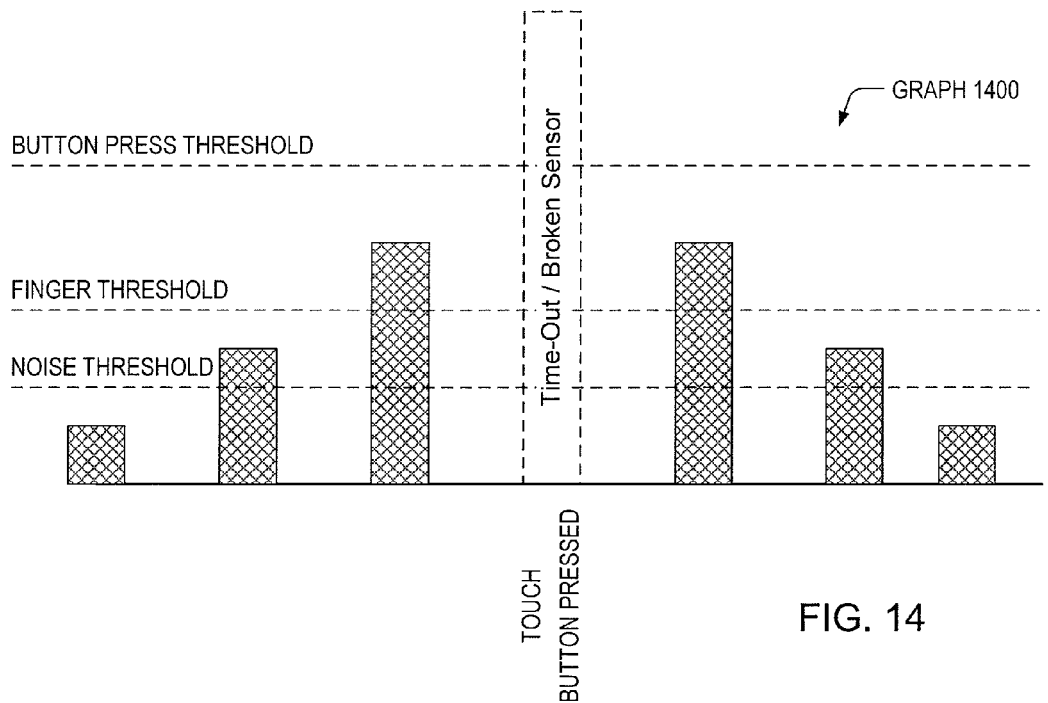
FIG. 14 illustrates an example operation of an integrated contact switch and touch sensor.

In connection with the noise and button press thresholds described in FIGS. 12 and 14, the embodiment of a scanning process illustrated in FIG. 17 enables undesirable scan data to be disregarded. For example, during each scan cycle the controller can scan (block 1700) touch sensor lines for touch input. If the controller determines that the scan data resulting from the scan of the touch sensor line falls below (block 1710) a noise threshold or exceeds (block 1720) a button press threshold, the controller can disregard (block 1740) the scan data (e.g., not retain it for further processing). However, if the controller determines that the scan data does not fall below (block 1710) the noise threshold and does not exceed (block 1720) the button press threshold, the controller can capture (block 1730) the scan data for further process (e.g., centroid analysis, etc.). By disregarding undesirable scan data such as that which falls below the noise threshold, the controller can save processing time and power by not wasting time on noise. By disregarding undesirable scan data such as that which exceeds the button press threshold, the controller can enhance reliability by not allowing skewed scan data adversely effect touch sensor detection. Rather, the controller can rely on the compensation techniques described above in connection with FIG. 15.

Figure 18:
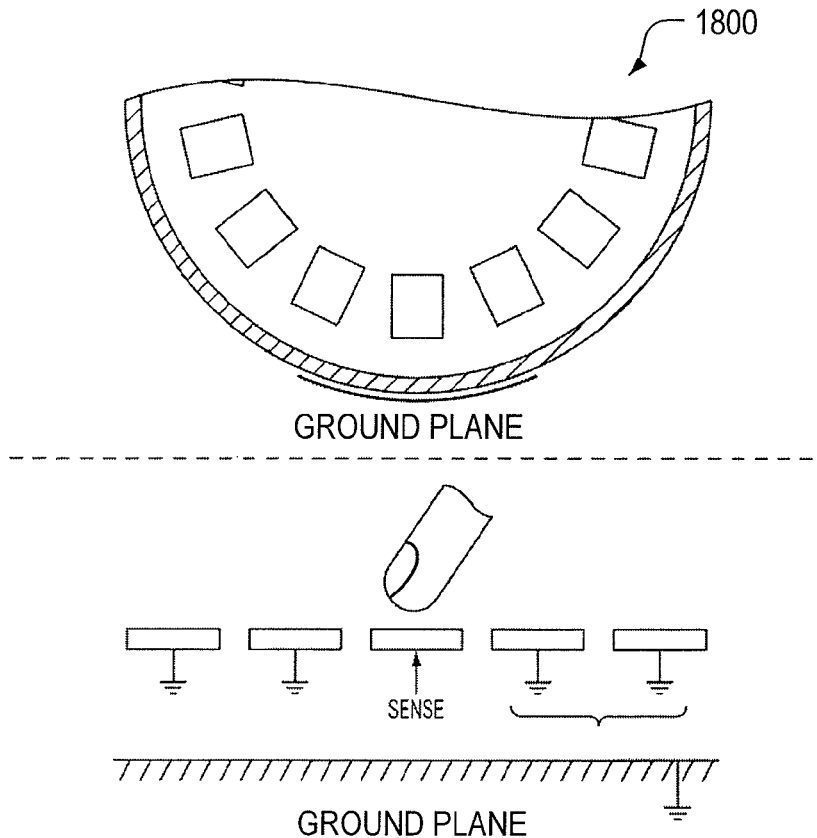
FIG. 18 illustrates an example of a sensing process.

FIGS. 18-21 describe various embodiments through which the above-described scanning process could be implemented. For example, FIG. 18 illustrates an example of a sensing process associated with touch sensor elements of input device 1800 in accordance with one embodiment. During a scan cycle, the controller can perform a sensing operation for each of the sensor elements in consecutive fashion. When a sensing operation is being performed in association with one of the sensor elements, the other sensor elements can be grounded. In one embodiment, the sensor elements can be disposed on a three conductive layer flex as described above.

Figure 19:
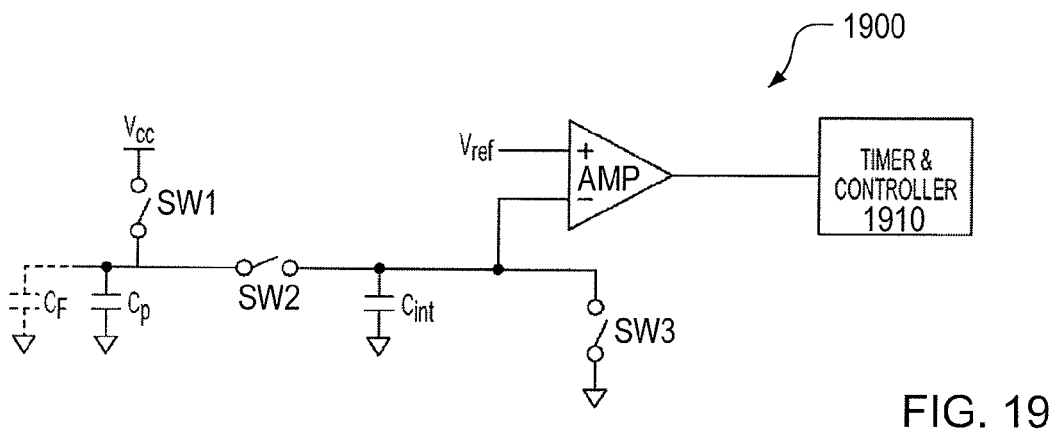
FIGS. 19-21 illustrate examples of sensing circuits.

FIG. 19 illustrates an example of a sensing circuit that can implement the sensing process of FIG. 18. A parasitic capacitance Cp can represent the sum of all capacitance from a sensor element associated with a sensing operation to surrounding conductive material (e.g., sensor element to ground plane and sensor element to grounded sensor elements). The capacitance Cf associated with an object such as a finger over the sensor element can increase the total capacitance C(C=Cp+Cf) associated with the sensor element above a threshold sense level. Timer and controller 1910 (which can correspond to the controllers described above) of sensing circuit 1900 can measure a capacitance associated with a sensor element by using relatively small capacitance Cp+Cf to charge relatively large capacitance Cint (associated with an integration capacitor) to voltage threshold Vref. Sensing circuit 1900 can produce a measurement value reflecting how long it takes (e.g., how may switching cycles as described below) to charge Cint to Vref. For example, a measurement value reflecting an input (e.g., the above input sense level values) can result from the time it takes for Cp+Cf to charge Cint to Vref minus the time it takes for Cp to charge Cint to Vref. Expressed formulaically, input=time(Cp+Cf)−time (Cp).

Figure 20:
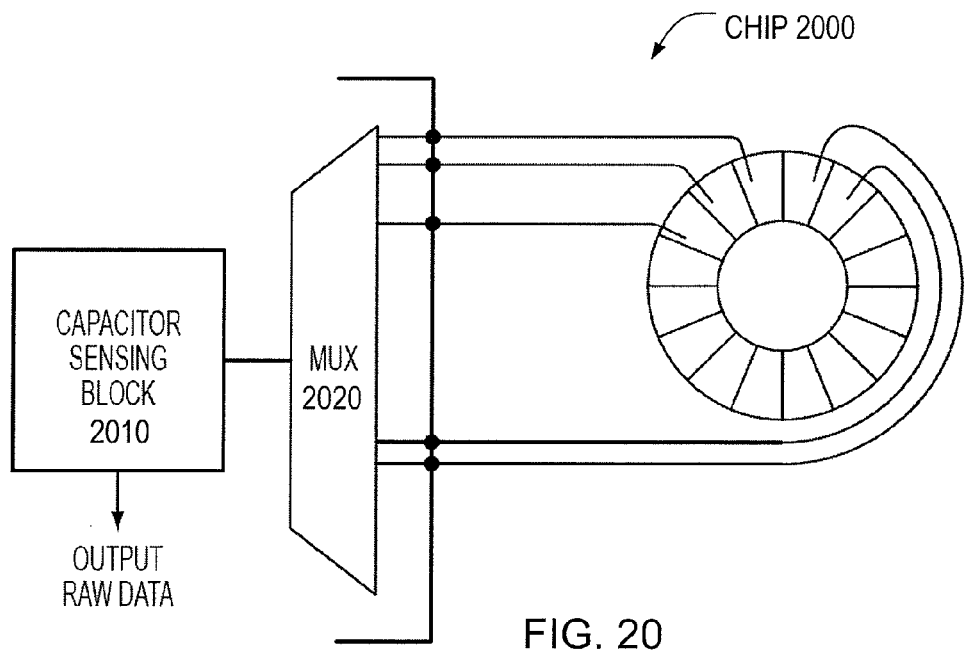
Figure 21:
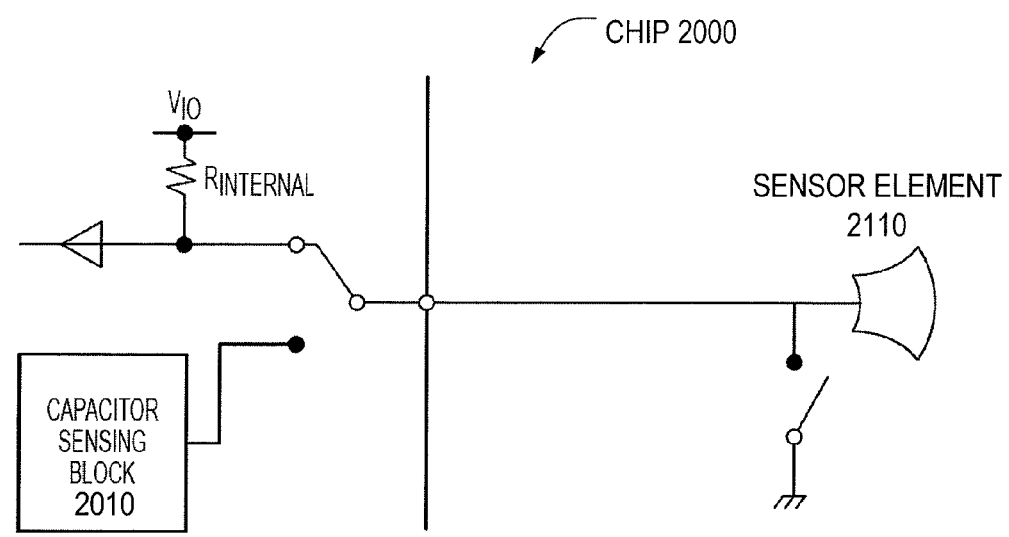

In operation, sensing circuit 1900 can operate as follows:
step 0: reset and start timer (assume Cint has no charge)
step 1: open transfer switch SW2, close charge switch SW1
(these can switch alternately very fast, e.g., MHz)
Cp+Cf are charged to Vcc (e.g., 3.0 V)
step 2: open charge switch SW1, close transfer switch SW2
Cp+Cf charge flows to Cint
repeat step 1 and step 2 until Cint reaches Vref (e.g., 1.1 V)

step 3: stop timer step 4: open charge switch SW1, open transfer switch SW2, close discharge switch SW3: discharges Cint to no charge state open discharge switch SW3 when done repeat for all sensor elements FIGS. 20 and 21 illustrate examples of sensing circuits associated with independent touch sensor elements and integrated contact switch and touch sensor elements in accordance with one embodiment. The controller can configure its GPIO pins in many ways using a multiplexer or switch network.

For example, in the configuration of FIG. 20, chip 2000 includes multiplexer 2020 that connects the sensor pad pins to capacitor sensing block 2010. Since there is only one capacitor sensing block, the controller of chip 2000 can perform the sensing for each sensor element one by one. While a generic multiplexer normally connects only one input to its output, multiplexer 2020 acts more like a switch network; it can connect multiple sensor elements together into its output. The output of capacitor sensing block 2010 can be a raw count indicating the capacitance of the sensor pad (e.g., the number of clock cycles it took to charge the integration capacitor to Vref).

In the configuration of FIG. 21, chip 2000 can configure the pin as a GPIO. The SPDT switch can be assumed to be part of multiplexer 2020 in FIG. 20, although simplified for clarity. In this configuration, the illustrated internal pull-up can be enabled and the pin configured as input. If the contact switch element is not pressed, the pin can be read as "high" due to the internal pull-up. If the button is pressed, the pin can be read as "low".

Chip 2000 can have a massive switching block between its pins and the internal blocks. The controller can perform the following steps:

step 1: if initial power-on, perform some initialization step 2: check if the device host is active by looking at signal driven by the host; a high signal can indicate that the host is active, and a low signal can indicate that the host is sleeping if the host is active, stay in ACTIVE mode if the host is sleeping, go to SLEEP ACTIVE steps:

Step 2.5: set timer (e.g., 16 ms) to wake us up (just set the alarm, keep continue executing)

Step 3: configure button pins as GPI (general purpose input)

read button states all together; take note of if any were not pressed but are now pressed (i.e. low)

Step 4: If MODE=ACTIVE:

connect each sensor pin to capacitor sensing block 2010 and record raw count; after all sensor elements are read, an array of #sensor raw counts (#sensor=16 according to embodiment of FIGS. 4-10) is recorded If MODE=IDLE:

connect multiple sensor elements (e.g., 3) to capacitor sensing block 2010 and record raw count; after all sensor elements are read, an array of (#sensor/3) raw counts (#sensor/3=6) is recorded Step 5: was this the initial sensing?

if YES=>store raw counts as baseline

Step 6: calculate the difference between raw count and baseline for each sensor element; store in signal array Step 7: are all sensor element signals less than noise threshold?

if YES, perform "baseline update"

Step 8: is any sensor element above finger threshold?

if YES, look for finger presence.

If mode=IDLE and finger detected, change mode to ACTIVE.

Step 9: was any button pressed from step #3?

if so, configure the button pins as GPI again and read the button states if the button(s) pressed in step 3 are still pressed (=debouncing), then report it to the host Step 10: if finger was down or up and/or button was pressed/depressed (step 9), send a packet to host Step 11: any finger presence after 3 scans?

if YES, set mode to IDLE mode

Step 12: go to sleep (16 ms timer set earlier in step 2.5 will wake controller up)

after waking up, go to step 2

SLEEP mode:

set button pins and host signal as GPI's.

enable interrupt on change enable wake-up on interrupt go to sleep (any status change on buttons or host pins will wake controller up)

after waking up, go to step 2

FINGER PRESENCE DETECTION:

are any sensor elements above finger threshold?

are there at least two neighboring sensor elements that are above finger threshold?=>Valid centroid count the number of valid centroids that are separated by at least one sensor element less than finger threshold for device supporting multi-touch: (X number of fingers can be detected): report if only X or less valid centroids exist for device supporting single touch: report if only one valid centroid exists

Figure 25:
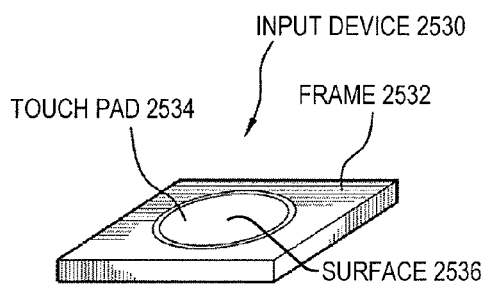
FIGS. 25-27 illustrate an example of operations of an input device.
Figure 26:
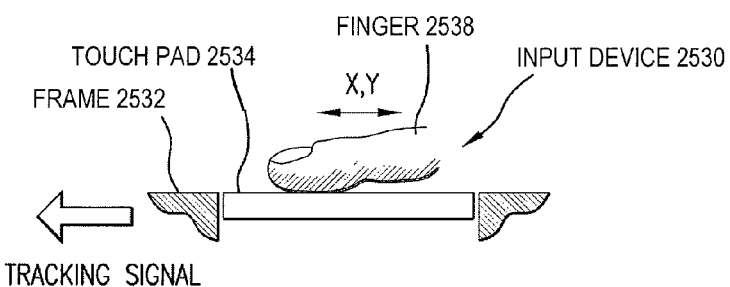
Figure 27:
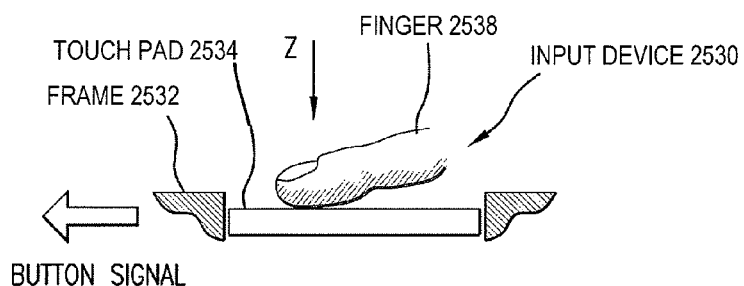

BASELINE UPDATE:

if raw count of sensor element is above its baseline count, slowly update baseline count towards the raw count value (this may take several scans and baseline update procedure calls)

if raw count of sensor element is below its baseline count (=negative finger), set baseline to raw count immediately FIGS. 25-27 illustrate operations of an input device according to some embodiments of the present disclosure. For example, the input device may generally correspond to any of the input devices mentioned above. In the example shown in FIG. 25, input device 2530 can be configured to send information or data to an electronic device in order to perform an action on a display screen (e.g., via a graphical user interface). Examples of actions that may be performed include, moving an input pointer, making a selection, providing instructions, etc. The input device can interact with the electronic device through a wired connection (e.g., cable/connector) or a wireless connection (e.g., IR, Bluetooth, etc.). Input device 2530 may be a stand alone unit or it may be integrated into the electronic device. As a stand alone unit, the input device can have its own enclosure. When integrated into an electronic device, the input device can typically use the enclosure of the electronic device. In either case, the input device can be structurally coupled to the enclosure, as for example, through screws, snaps, retainers, adhesives and the like. In some cases, the input device may be removably coupled to the electronic device, as for example, through a docking station. The electronic device to which the input device may be coupled can correspond to any consumer related electronic product. For example, the electronic device can correspond to a computer such as a desktop computer, laptop computer or PDA, a media player such as a music player, a communication device such as a cellular phone, another input device such as a keyboard, and the like.

As shown in FIG. 25, in this embodiment input device 2530 may include frame 2532 (or support structure) and touch pad 2534. Frame 2532 can provide a structure for supporting the components of the input device. Frame 2532 in the form of a housing can also enclose or contain the components of the input device. The components, which may include touch pad 2534, can correspond to electrical, optical and/or mechanical components for operating input device 2530. Frame 2532 may be a separate component or it may be an integral component of the housing of the electronic device.

Touch pad 2534 can provide location information for an object, such as a finger for example, in contact with or in proximity to the touch pad. This information can be used in combination with information provided by a movement indicator to generate a single command associated with the movement of the touch pad. The touch pad may be used as an input device by itself; for example, the touch pad may be used to scroll through a list of items on the device.

The shape, size and configuration of touch pad 2534 may be widely varied. In addition to the touchpad configurations disclosed above, a conventional touch pad based on the Cartesian coordinate system, or based on a Polar coordinate system can be configured to provide scrolling using rotational movements and can be configured to accept the multi-touch and gestures, for example those described herein. Furthermore, touch pad 2534 can be used in at least two different modes, which may be referred to as a relative mode and an absolute mode. In absolute mode, touch pad 2534 can, for example, report the absolute coordinates of the location at which it may be touched. For example, these would be "x" and "y" coordinates in the case of a standard Cartesian coordinate system or (r,θ) in the case of a Polar coordinate system. In relative mode, touch pad 2534 can report the direction and/or distance of change, for example, left/right, up/down, and the like. In most cases, the signals produced by touch pad 2534 can direct movement on the display screen in a direction similar to the direction of the finger as it may be moved across the surface of touch pad 2534.

The shape of touch pad 2534 may be widely varied. For example, it may be circular, oval, square, rectangular, triangular, and the like. In general, the outer perimeter can define the working boundary of touch pad 2534. In the embodiment illustrated in FIG. 25, the touch pad may be circular. Circular touch pads can allow a user to continuously swirl a finger in a free manner, i.e., the finger may be rotated through 360 degrees of rotation without stopping. This form of motion can produce incremental or accelerated scrolling through a list of songs being displayed on a display screen, for example. Furthermore, the user may rotate his or her finger tangentially from all sides, thus providing more finger position range. Both of these features may help when performing a scrolling function. Furthermore, the size of touch pad 2534 can accommodate manipulation by a user (e.g., the size of a finger tip or larger).

Touch pad 2534, which can generally take the form of a rigid platform. The rigid platform may be planar, convex or concave, and may include touchable outer surface 2536, which may be textured, for receiving a finger or other object for manipulation of the touch pad. Although not shown in FIG. 25, beneath touchable outer surface 2536 can be a sensor arrangement that may be sensitive to such things as the pressure and movement of a finger thereon. The sensor arrangement may typically include a plurality of sensors that can be configured to activate as the finger sits on, taps on or passes over them. In the simplest case, an electrical signal can be produced each time the finger is positioned over a sensor. The number of signals in a given time frame may indicate location, direction, speed and acceleration of the finger on touch pad 2534, i.e., the more signals, the more the user moved his or her finger. In most cases, the signals can be monitored by an electronic interface that converts the number, combination and frequency of the signals into location, direction, speed and acceleration information. This information can then be used by the electronic device to perform the desired control function on the display screen. The sensor arrangement may be widely varied. For example, the sensors can be based on resistive sensing, surface acoustic wave sensing, pressure sensing (e.g., strain gauge), optical sensing, capacitive sensing and the like.

In the embodiment illustrated in FIG. 25, touch pad 2534 may be based on capacitive sensing. In most cases, the capacitive touch pad may include a protective shield, one or more electrode layers, a circuit board and associated electronics including an application specific integrated circuit (ASIC). The protective shield can be placed over the electrodes, the electrodes can be mounted on the top surface of the circuit board, and the ASIC can be mounted on the bottom surface of the circuit board. The protective shield may serve to protect the underlayers and to provide a surface for allowing a finger to slide thereon. The surface may generally be smooth so that the finger does not stick to it when moved. The protective shield also may provide an insulating layer between the finger and the electrode layers. The electrode layer may include a plurality of spatially distinct electrodes. Any suitable number of electrodes can be used. As the number of electrodes increases, the resolution of the touch pad also increases.

In accordance with one embodiment, touch pad 2534 can be movable relative to the frame 2532. This movement can be detected by a movement detector that generates another control signal. For example, touch pad 2534 in the form of the rigid planar platform can rotate, pivot, slide, translate, flex and/or the like relative to frame 2532. Touch pad 2534 can be coupled to frame 2532 and/or it can be movably restrained by frame 2532. For example, touch pad 2534 can be coupled to frame 2532 through axels, pin joints, slider joints, ball and socket joints, flexure joints, magnets, cushions and/or the like. Touch pad 2534 can also float within a space of the frame (e.g., gimbal). It should be noted that input device 2530 may additionally include a combination of joints such as a pivot/translating joint, pivot/flexure joint, pivot/ball and socket joint, translating/flexure joint, and the like to increase the range of movement (e.g., increase the degree of freedom).

When moved, touch pad 2534 can be configured to actuate a movement detector circuit that generates one or more signals. The circuit may generally include one or more movement detectors such as switches, sensors, encoders, and the like.

In the embodiment illustrated in FIG. 25, touch pad 2534 can be part of a depressible platform. The touch pad can operate as a button and perform one or more mechanical clicking actions. Multiple functions or the same function of the device may be accessed by depressing the touch pad 2534 in different locations. A movement detector signals that touch pad 2534 has been depressed, and touch pad 2534 signals a location on the platform that has been touched. By combining both the movement detector signals and touch pad signals, touch pad 2534 acts like multiple buttons such that depressing the touch pad at different locations corresponds to different buttons. As shown in FIGS. 26 and 27, according to one embodiment touch pad 2534 can be capable of moving between an upright position (FIG. 26) and a depressed position (FIG. 27) when a requisite amount of force from finger 2538, palm, hand or other object is applied to touch pad 2534. Touch pad 2534 can be spring biased in the upright position, as for example through a spring member. Touch pad 2534 moves to the depressed position when the spring bias is overcome by an object pressing on touch pad 2534.

As shown in FIG. 26, touch pad 2534 generates tracking signals when an object such as a user's finger is moved over the top surface of the touch pad in the x,y plane. As shown in FIG. 27, in the depressed position (z direction), touch pad 2534 generates positional information and a movement indicator generates a signal indicating that touch pad 2534 has moved. The positional information and the movement indication can be combined to form a button command. Different button commands or the same button command can correspond to depressing touch pad 2534 in different locations. The button commands may be used for various functionalities including, but not limited to, making selections or issuing commands associated with operating an electronic device. For example, in the case of a music player, the button commands may be associated with opening a menu, playing a song, fast forwarding a song, seeking through a menu and the like.

To elaborate, touch pad 2534 can be configured to actuate a movement detector, which together with the touch pad positional information, can form a button command when touch pad 2534 is moved to the depressed position. The movement detector can be located within frame 2532 and coupled to touch pad 2534 and/or frame 2532. The movement detector may be any combination of switches and sensors. Switches can be generally configured to provide pulsed or binary data such as activate (on) or deactivate (off). For example, an underside portion of touch pad 2534 can be configured to contact or engage (and thus activate) a switch when the user presses on touch pad 2534. The sensors, on the other hand, can be generally configured to provide continuous or analog data. For example, the sensor can be configured to measure the position or the amount of tilt of touch pad 2534 relative to the frame when a user presses on the touch pad 2534. Any suitable mechanical, electrical and/or optical switch or sensor may be used. For example, tact switches, force sensitive resistors, pressure sensors, proximity sensors, and the like may be used. In some case, the spring bias for placing touch pad 2534 in the upright position may be provided by a movement detector that includes a spring action. In other embodiments, input device 2530 can include one or more movement detectors in various locations positioned under and/or above touch pad 2534 to form button commands associated with the particular locations in which the movement detector is actuated. Touch pad 2534 may can also be configured to provide a force feedback response.

Figure 28:
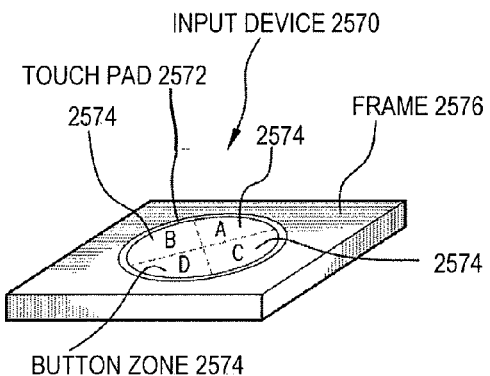
FIG. 28 illustrates an example of an input device.

FIG. 28 illustrates a simplified perspective diagram of input device 2570. Like the input device shown in the embodiment of FIGS. 25-27, this input device 2570 incorporates the functionality of one or more buttons directly into touch pad 2572, i.e., the touch pad acts like a button. In this embodiment, however, touch pad 2572 can be divided into a plurality of independent and spatially distinct button zones 2574. Button zones 2574 may represent regions of the touch pad 2572 that can be moved by a user to implement distinct button functions or the same button function. The dotted lines may represent areas of touch pad 2572 that make up an individual button zone. Any number of button zones may be used, for example, two or more, four, eight, etc. In the embodiment illustrated in FIG. 28, touch pad 2572 may include four button zones 2574 (i.e., zones A-D).

As should be appreciated, the button functions generated by pressing on each button zone may include selecting an item on the screen, opening a file or document, executing instructions, starting a program, viewing a menu, and/or the like. The button functions may also include functions that make it easier to navigate through the electronic system, as for example, zoom, scroll, open different menus, home the input pointer, perform keyboard related actions such as enter, delete, insert, page up/down, and the like. In the case of a music player, one of the button zones may be used to access a menu on the display screen, a second button zone may be used to seek forward through a list of songs or fast forward through a currently playing song, a third button zone may be used to seek backwards through a list of songs or fast rearward through a currently playing song, and a fourth button zone may be used to pause or stop a song that may be in the process of being played.

To elaborate, touch pad 2572 can be capable of moving relative to frame 2576 so as to create a clicking action. Frame 2576 can be formed from a single component or a combination of assembled components. The clicking action can actuate a movement detector contained inside frame 2576. The movement detector can be configured to sense movements of the button zones during the clicking action and to send a signal corresponding to the movement to the electronic device. For example, the movement detectors may be switches, sensors and/or the like.

In addition, touch pad 2572 can be configured to send positional information on what button zone may be acted on when the clicking action occurs. The positional information can allow the device to determine which button zone to activate when the touch pad is moved relative to the frame.

The movements of each of button zones 2574 may be provided by various rotations, pivots, translations, flexes and the like. In one embodiment, touch pad 2572 can be configured to gimbal relative to frame 2576. By gimbal, it is generally meant that the touch pad 2572 can float in space relative to frame 2576 while still being constrained thereto. The gimbal can allow the touch pad 2572 to move in single or multiple degrees of freedom (DOF) relative to the housing, for example, movements in the x,y and/or z directions and/or rotations about the x,y, and/or z axes ($\theta x \theta y \theta z$).

Figure 29:
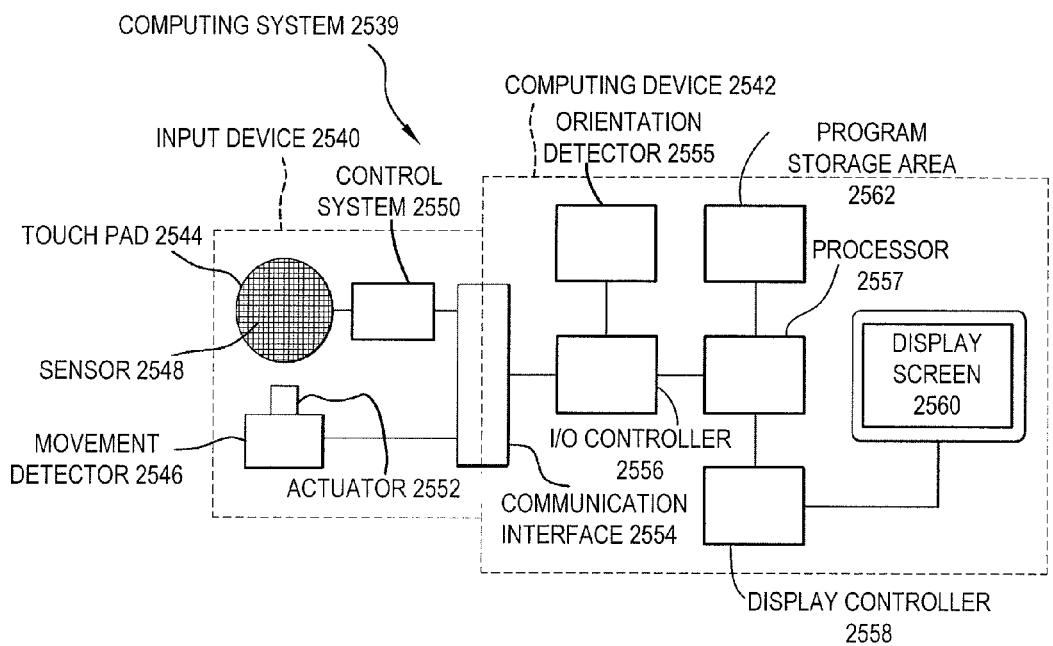
FIG. 29 illustrates an example of a computing system.

FIG. 29 illustrates an example of a simplified block diagram of a computing system 2539. The computing system may generally include input device 2540 operatively connected to computing device 2542. For example, input device 2540 can generally correspond to input device 2530 shown in FIGS. 25-27, and the computing device 2542 can correspond to a computer, PDA, media player or the like. As shown, input device 2540 may include depressible touch pad 2544 and one or more movement detectors 2546. Touch pad 2544 can be configured to generate tracking signals and movement detector 2546 can be configured to generate a movement signal when the touch pad is depressed. Although touch pad 2544 may be widely varied, in this embodiment, touch pad 2544 can include capacitance sensors 2548 and control system 2550 (which can generally correspond to the controllers described above) for acquiring position signals from sensors 2548 and supplying the signals to computing device 2542. Control system 2550 can include an application specific integrated circuit (ASIC) that can be configured to monitor the signals from sensors 2548, to compute the absolute location, angular location, direction, speed and/or acceleration of the monitored signals and to report this information to a processor of computing device 2542. Movement detector 2546 may also be widely varied. In this embodiment, however, movement detector 2546 can take the form of a switch that generates a movement signal when touch pad 2544 is depressed. Movement detector 2546 can correspond to a mechanical, electrical or optical style switch. In one particular implementation, movement detector 2546 can be a mechanical style switch that includes protruding actuator 2552 that may be pushed by touch pad 2544 to generate the movement signal. For example, the switch may be a tact or dome switch.

Both touch pad 2544 and movement detector 2546 can be operatively coupled to computing device 2542 through communication interface 2554. The communication interface provides a connection point for direct or indirect connection between the input device and the electronic device. Communication interface 2554 may be wired (wires, cables, connectors) or wireless (e.g., transmitter/receiver).

Referring to computing device 2542, it may include processor 2557 (e.g., CPU or microprocessor) configured to execute instructions and to carry out operations associated with computing device 2542. For example, using instructions retrieved from memory, the processor can control the reception and manipulation of input and output data between components of computing device 2542. Processor 2557 can be configured to receive input from both movement detector 2546 and touch pad 2544 and can form a signal/command that may be dependent upon both of these inputs. In most cases, processor 2557 can execute instruction under the control of an operating system or other software. Processor 2557 may be a single-chip processor or may be implemented with multiple components.

Computing device 2542 may also include input/output (I/O) controller 2556 that can be operatively coupled to processor 2557. (I/O) controller 2556 can be integrated with processor 2557 or it may be a separate component as shown. I/O controller 2556 can generally be configured to control interactions with one or more I/O devices that may be coupled to the computing device 2542, as for example input device 2540 and orientation detector 2555, such as an accelerometer. I/O controller 2556 can generally operate by exchanging data between computing device 2542 and I/O devices that desire to communicate with computing device 2542.

Computing device 2542 may also include display controller 2558 that can be operatively coupled to processor 2557. Display controller 2558 can be integrated with processor 2557 or it may be a separate component as shown. Display controller 2558 can be configured to process display commands to produce text and graphics on display screen 2560. For example, display screen 2560 may be a monochrome display, color graphics adapter (CGA) display, enhanced graphics adapter (EGA) display, variable-graphics-array (VGA) display, super VGA display, liquid crystal display (e.g., active matrix, passive matrix and the like), cathode ray tube (CRT), plasma displays and the like. In the embodiment illustrated in FIG. 29, the display device corresponds to a liquid crystal display (LCD).

In some cases, processor 2557 together with an operating system operates to execute computer code and produce and use data. The computer code and data can reside within program storage area 2562 that may be operatively coupled to processor 2557. Program storage area 2562 can generally provide a place to hold data that may be used by computing device 2542. For example, the program storage area may include Read-Only Memory (ROM), Random-Access Memory (RAM), hard disk drive and/or the like. The computer code and data could also reside on a removable program medium and loaded or installed onto the computing device when needed. In one embodiment, program storage area 2562 can be configured to store information for controlling how the tracking and movement signals generated by the input device may be used, either alone or in combination for example, by computing device 2542 to generate an input event command, such as a single button press for example.

FIGS. 30-33 illustrate applications of an input device according to some embodiments of the present disclosure. As previously mentioned, the input devices described herein can be integrated into an electronic device or they can be separate stand alone devices. FIGS. 30-33 show some implementations of input device 2520 integrated into an electronic device. FIG. 30 shows input device 2520 incorporated into media player 2512. FIG. 31 shows input device 2520 incorporated into laptop computer 2514. FIGS. 32 and 33, on the other hand, show some implementations of input device 2520 as a stand alone unit. FIG. 32 shows input device 2520 as a peripheral device that can be connected to desktop computer 2516. FIG. 33 shows input device 2520 as a remote control that wirelessly connects to docking station 2518 with media player 2512 docked therein. It should be noted, however, that in some embodiments the remote control can also be configured to interact with the media player (or other electronic device) directly, thereby eliminating the need for a docking station. It should be noted that these particular embodiments do not limit the present disclosure and that many other devices and configurations may be used.

Referring back to FIG. 30, media player 2512, housing 2522 and display screen 2524 may generally correspond to those described above. As illustrated in the embodiment of FIG. 30, display screen 2524 can be visible to a user of media player 2512 through opening 2525 in housing 2522 and through transparent wall 2526 disposed in front of opening 2525. Although transparent, transparent wall 2526 can be considered part of housing 2522 since it helps to define the shape or form of media player 2512.

Media player 2512 may also include touch pad 2520 such as any of those previously described. Touch pad 2520 can generally consist of touchable outer surface 2531 for receiving a finger for manipulation on touch pad 2520. Although not illustrated in the embodiment of FIG. 30, beneath touchable outer surface 2531 a sensor arrangement can be configured in a manner as previously described. Information provided by the sensor arrangement can be used by media player 2512 to perform the desired control function on display screen 2524. For example, a user may easily scroll through a list of songs by swirling the finger around touch pad 2520.

In addition to above, the touch pad may also include one or more movable buttons zones A-D as well as a center button E for example. The button zones can be configured to provide one or more dedicated control functions for making selections or issuing commands associated with operating media player 2512. For example, in the case of an MP3 music player, the button functions can be associated with opening a menu, playing a song, fast forwarding a song, seeking through a menu, making selections and the like. In some embodiments, the button functions can be implemented via a mechanical clicking action.

The position of touch pad 2520 relative to housing 2522 may be widely varied. For example, touch pad 2520 can be placed at any surface (e.g., top, side, front, or back) of housing 2522 accessible to a user during manipulation of media player 2512. In some embodiments, touch sensitive surface 2531 of touch pad 2520 can be completely exposed to the user. In the embodiment illustrated in FIG. 30, touch pad 2520 can be located in a lower front area of housing 2522. Furthermore, touch pad 2520 can be recessed below, level with, or extend above the surface of housing 2522. In the embodiment illustrated in FIG. 30, touch sensitive surface 2531 of touch pad 2520 can be substantially flush with an external surface of housing 2522.

The shape of touch pad 2520 may also be widely varied. Although illustrated as circular in the embodiment of FIG. 30, the touch pad can also be square, rectangular, triangular, and the like for example. More particularly, the touch pad can be annular, i.e., shaped like or forming a ring. As such, the inner and outer perimeter of the touch pad can define the working boundary of the touch pad.

It will be appreciated that the above description for clarity has described embodiments of the disclosure with reference to different functional units and processors. However, it will be apparent that any suitable distribution of functionality between different functional units or processors may be used without detracting from the disclosure. For example, functionality illustrated to be performed by separate processors or controllers may be performed by the same processors or controllers. Hence, references to specific functional units may be seen as references to suitable means for providing the described functionality rather than indicative of a strict logical or physical structure or organization.

The disclosure may be implemented in any suitable form, including hardware, software, firmware, or any combination of these. The disclosure may optionally be implemented partly as computer software running on one or more data processors and/or digital signal processors. The elements and components of an embodiment of the disclosure may be physically, functionally, and logically implemented in any suitable way. Indeed, the functionality may be implemented in a single unit, in a plurality of units, or as part of other functional units. As such, the disclosure may be implemented in a single unit or may be physically and functionally distributed between different units and processors.

One skilled in the relevant art will recognize that many possible modifications and combinations of the disclosed embodiments can be used, while still employing the same basic underlying mechanisms and methodologies. The foregoing description, for purposes of explanation, has been written with references to specific embodiments. However, the illustrative discussions above are not intended to be exhaustive or to limit the disclosure to the precise forms disclosed. Many modifications and variations can be possible in view of the above teachings. The embodiments were chosen and described to explain the principles of the disclosure and their practical applications, and to enable others skilled in the art to best utilize the disclosure and various embodiments with various modifications as suited to the particular use contemplated.

Further, while this specification contains many specifics, these should not be construed as limitations on the scope of what is being claimed or of what may be claimed, but rather as descriptions of features specific to particular embodiments. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

What is claimed is:

1. A method comprising:
   providing a common sensor line connected to a touch sensor element arranged on a first surface of a substrate and a contact switch element arranged on a second surface of the substrate,
   capturing scan data based on a scan of the common sensor line for push button input, and
   estimating scan data for the touch sensor element if the captured scan data indicates push button input.

2. The method of claim 1, wherein the estimated scan data is based on scan data associated with the touch sensor element from one or more previous scan cycles.

3. The method of claim 1, wherein the estimated scan data is based on captured scan data associated with neighboring touch sensor elements.

4. The method of claim 3, wherein the estimated scan data is based on an average of the captured scan data associated with the neighboring touch sensor elements.

5. A method comprising:
   capturing scan data from a sensor line common to a touch sensor element arranged on a first surface of a substrate and a contact switch element arranged on a second surface of the substrate,
   determining that a touch input has occurred if the scan data lies between a first threshold level and a second threshold level, and
   disregarding the scan data if the scan data exceeds the second threshold level.

6. The method of claim 5, wherein the scan data indicates a level of capacitance associated with the touch sensor element.

7. The method of claim 5, wherein scan data exceeding the second threshold indicates that the contact switch element is being pressed.

8. The method of claim 5, further comprising
   disregarding the scan data if the scan data falls below a third threshold level.

9. The method of claim 8, wherein the third threshold level indicates a noise threshold.

10. An input device comprising:
    a substrate comprising a first surface and a second surface,
    a touch sensor element arranged on the first surface of the substrate,
    a contact switch element arranged on the second surface of the substrate,
    a common sensor line connected to the touch sensor element and the contact switch element, and
    a controller configured to
       capture scan data based on a scan of the common sensor line for push button input, and
       estimate scan data for the touch sensor element if the captured scan data indicates push button input.

11. The input device of claim 10, wherein the estimated scan data is based on scan data associated with the touch sensor element from one or more previous scan cycles.

12. The input device of claim 10, wherein the estimated scan data is based on captured scan data associated with neighboring touch sensor elements.

13. The input device of claim 12, wherein the estimated scan data is based on an average of the captured scan data associated with the neighboring touch sensor elements.

14. An input device comprising:
    a substrate comprising a first surface and a second surface,
    a touch sensor element arranged on the first surface of the substrate, a contact switch element arranged on the second surface of the substrate, a sensor line common to the touch sensor element and the contact switch element, and a controller configured to capture scan data from the sensor line, determine that a touch input has occurred if the scan data lies between a first threshold level and a second threshold level, and disregard the scan data if the scan data exceeds the second threshold level.

15. The input device of claim 14, wherein the scan data indicates a level of capacitance associated with the touch sensor element.

16. The input device of claim 14, wherein scan data exceeding the second threshold indicates that the contact switch element is being pressed.

17. The input device of claim 14, wherein the controller is configured to disregard the scan data if the scan data falls below a third threshold level.

18. The input device of claim 17, wherein the third threshold level indicates a noise threshold.

* * * * *